US010788657B2

(12) United States Patent
Kawasaki et al.

(10) Patent No.: US 10,788,657 B2
(45) Date of Patent: Sep. 29, 2020

(54) MICROSCOPE ILLUMINATION DEVICE AND MICROSCOPE

(71) Applicant: OLYMPUS CORPORATION, Hachioji-shi, Tokyo (JP)

(72) Inventors: Kenji Kawasaki, Tokyo (JP); Masahito Dohi, Tokyo (JP)

(73) Assignee: OLYMPUS CORPORATION, Tokyo (JP)

( * ) Notice: Subject to any disclaimer, the term of this patent is extended or adjusted under 35 U.S.C. 154(b) by 38 days.

(21) Appl. No.: 15/983,265

(22) Filed: May 18, 2018

(65) Prior Publication Data
US 2018/0341097 A1 Nov. 29, 2018

(30) Foreign Application Priority Data

May 25, 2017 (JP) ................. 2017-103479

(51) Int. Cl.
G02B 21/06 (2006.01)
G02B 21/08 (2006.01)
G02B 21/16 (2006.01)
G02B 19/00 (2006.01)

(52) U.S. Cl.
CPC ........ *G02B 21/086* (2013.01); *G02B 19/0009* (2013.01); *G02B 19/0066* (2013.01); *G02B 21/16* (2013.01)

(58) Field of Classification Search
CPC ............... G02B 21/00; G02B 21/0012; G02B 21/0016; G02B 21/0032; G02B 21/0088; G02B 21/06; G02B 21/086; G02B 21/088; G02B 21/125; G02B 19/0061; G02B 19/0066
See application file for complete search history.

(56) References Cited

U.S. PATENT DOCUMENTS

| 5,777,784 A * | 7/1998 | Tanaka | G02B 21/082 359/381 |
| 5,880,861 A | 3/1999 | Nishida | |
| 7,443,578 B2 * | 10/2008 | Yamazaki | G02B 21/082 359/387 |
| 7,480,095 B2 * | 1/2009 | Mizusawa | G02B 21/02 359/381 |
| 9,568,722 B2 * | 2/2017 | Reimer | G02B 21/0012 |

(Continued)

FOREIGN PATENT DOCUMENTS

| JP | H09274138 A | 10/1997 | |
| JP | 2005148296 A | 6/2005 | |
| JP | 2007-333800 | * 12/2007 | G02B 21/06 |

*Primary Examiner* — Thong Q Nguyen
(74) *Attorney, Agent, or Firm* — Holtz, Holtz & Volek PC

(57) ABSTRACT

A microscope illumination device includes a white LED light source and an illumination optical system. The white LED light source includes a substrate, a plurality of LED chips, and a fluorescent substance layer provided to cover the plurality of LED chips, the plurality of LED chips being arrayed on the substrate and being configured to emit excitation light. The illumination optical system includes a field stop and a light diffusion element that is arranged between the white LED light source and the field stop. The microscope illumination device satisfies $$0.2 < d/p < 1 \tag{1}$$

where p is a minimum interval between centers of the plurality of LED chips and d is a size of each of the plurality of LED chips.

14 Claims, 13 Drawing Sheets

(56) References Cited

U.S. PATENT DOCUMENTS

2010/0302630 A1* 12/2010 Paulus .................. G02B 21/06
359/385
2015/0034978 A1* 2/2015 Hussell .............. H01L 25/0753
257/89
2018/0149850 A1* 5/2018 Kawasaki .............. G02B 21/16

* cited by examiner

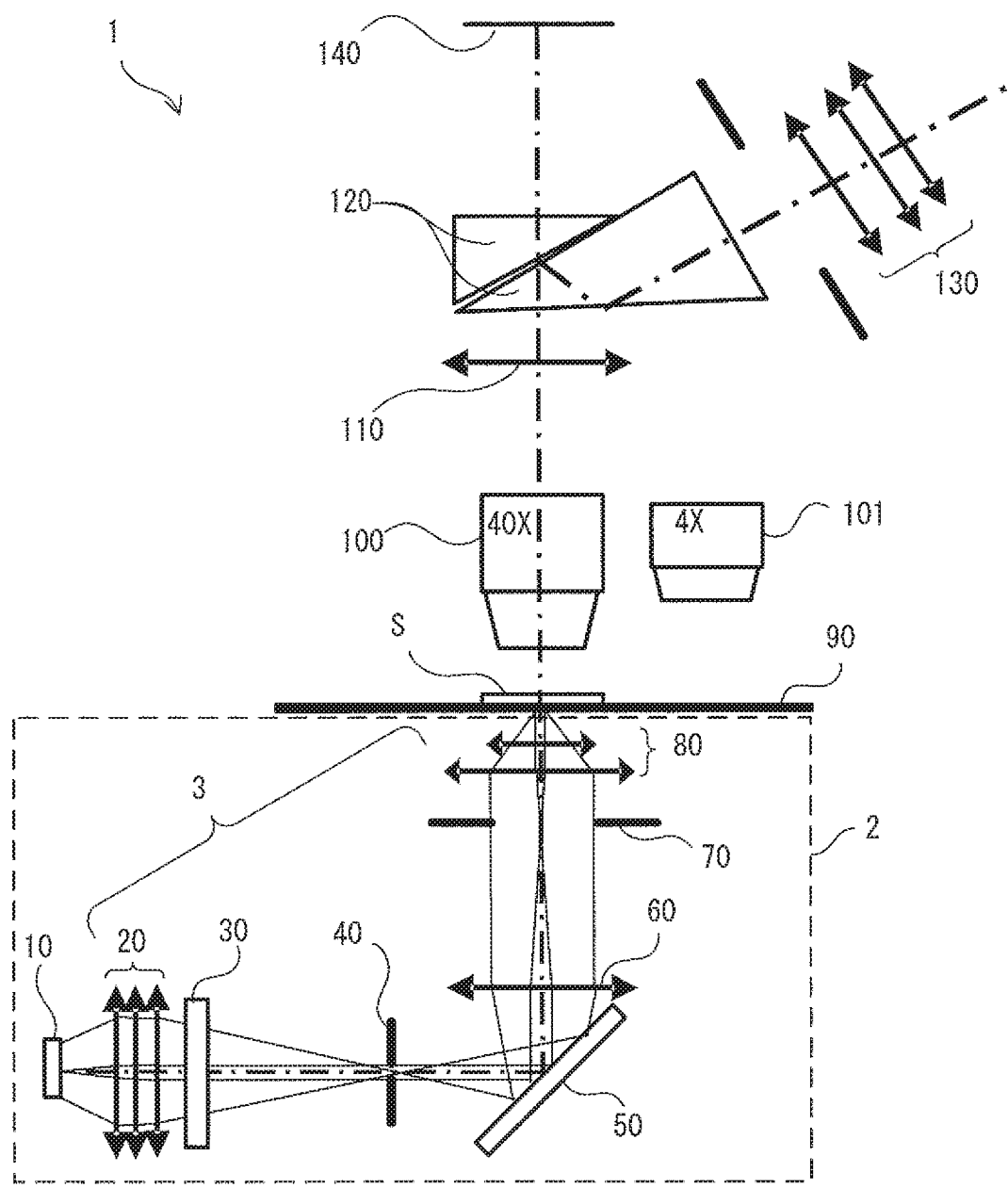
F I G. 1

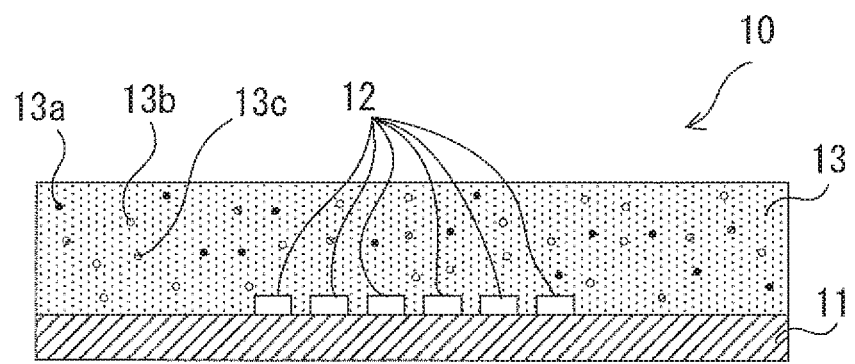
F I G. 2

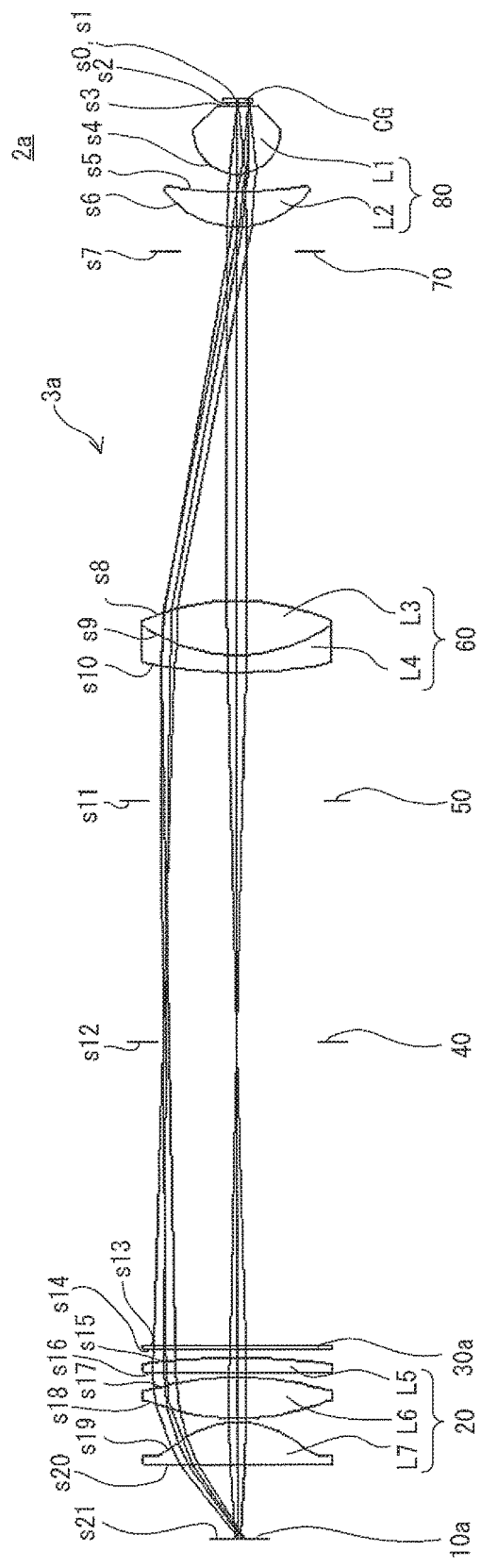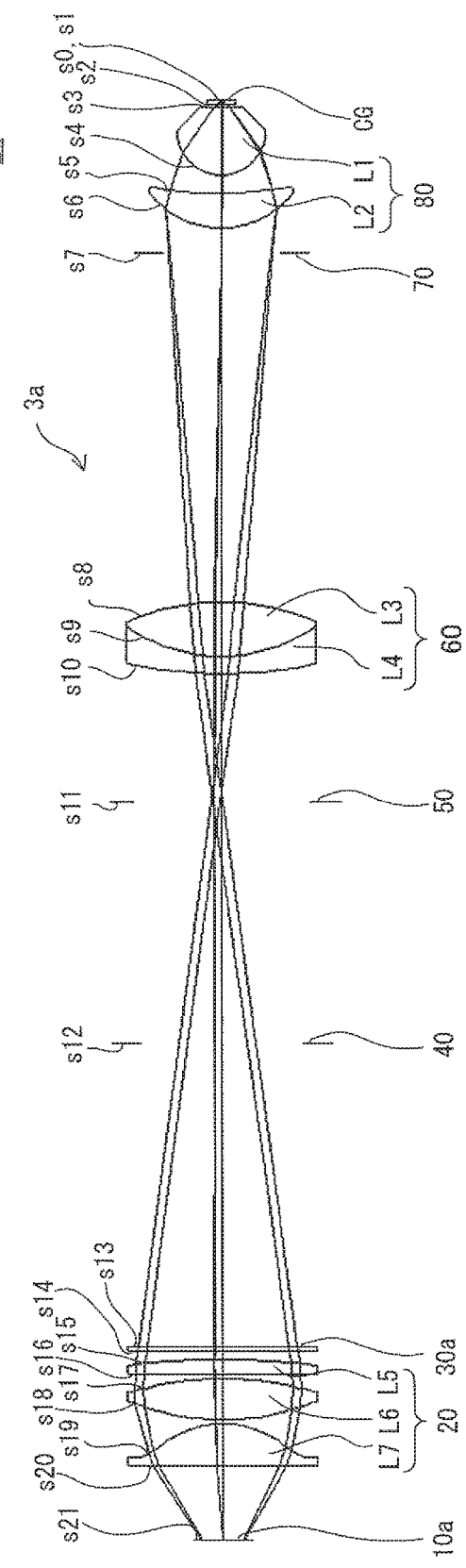
FIG. 5A
FIG. 5B

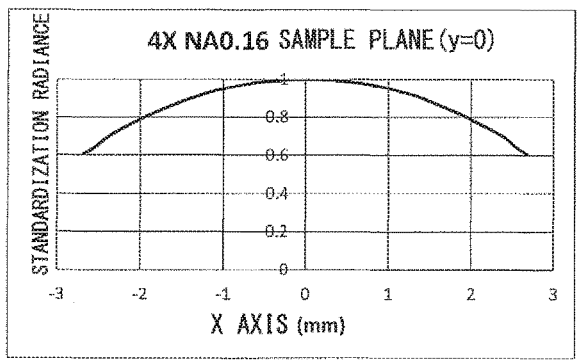
F I G. 1 3 A
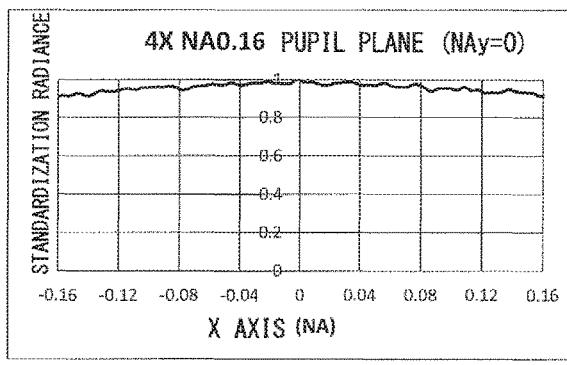
F I G. 1 3 B
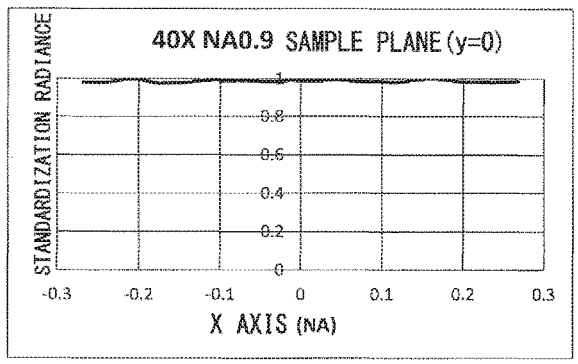
F I G. 1 3 C
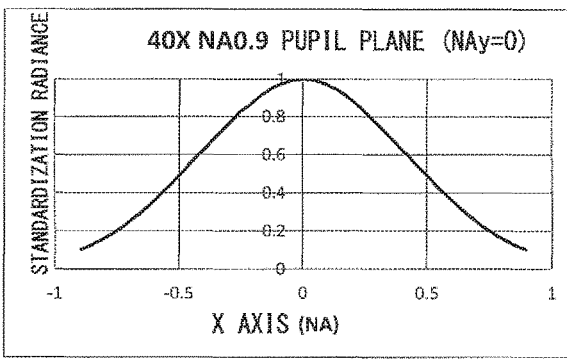
F I G. 1 3 D
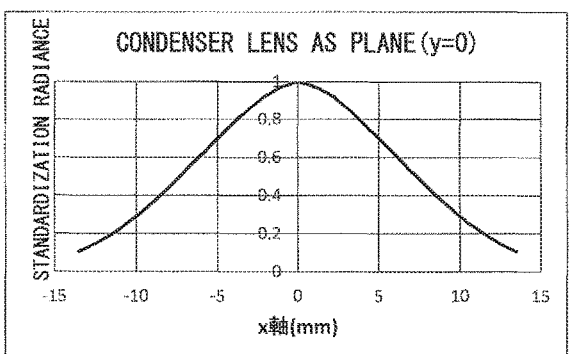
F I G. 1 3 E

US 10,788,657 B2

MICROSCOPE ILLUMINATION DEVICE AND MICROSCOPE

CROSS REFERENCE TO RELATED APPLICATIONS

This application is based upon and claims the benefit of priority from prior Japanese Patent Application No. 2017-103479, filed May 25, 2017, the entire contents of which are incorporated herein by this reference.

BACKGROUND OF THE INVENTION

Field of the Invention

The disclosure of this document is related to a microscope illumination device having a white light emitting diode (LED) source, and to a microscope.

Description of the Related Art

Halogen light sources, which have conventionally been used widely as microscope light sources, have a non-uniform luminance distribution that depends upon the shape of the filament on the light-emitting surface. Many types of microscope illumination devices provided with alight diffusion element have been proposed in order to reduce illumination unevenness caused by a non-uniform luminance distribution on a light-emitting surface.

However, while light diffusion elements reduce illumination unevenness, they cause a loss in the amount of light. In view of this, techniques are proposed that reduce illumination unevenness while suppressing a loss in the amount of light in a light diffusion element. For example, Japanese Laid-open Patent Publication No. 2005-148296 and Japanese Laid-open Patent Publication No. 09-274138 disclose techniques such as this.

SUMMARY OF THE INVENTION

A microscope illumination device according to an aspect of the present invention includes a white LED light source and an illumination optical system. The white LED light source includes a substrate, a plurality of LED chips, and a fluorescent substance layer provided to cover the plurality of LED chips, the plurality of LED chips being arrayed on the substrate and being configured to emit excitation light. The illumination optical system irradiates a subject with light from the white LED light source. The illumination optical system includes a field stop and a light diffusion element, and is arranged to illuminate the subject by Kohler illumination, the light diffusion element being arranged between the white LED light source and the field stop and being configured to diffuse the light. The microscope illumination device satisfies a conditional expression of $$0.2 < d/p < 1 \quad (1)$$

where p is a minimum interval between centers of the plurality of LED chips and d is a size of each of the plurality of LED chips.

A microscope according to another aspect of the present invention includes the microscope illumination device according to the above aspect and an objective.

BRIEF DESCRIPTION OF THE DRAWINGS

The present invention will be more apparent from the following detailed description when the accompanying drawings are referenced.

FIG. 1 exemplifies a configuration of a microscope 1;

FIG. 2 schematically illustrates a section of a white LED light source 10;

FIG. 5A is a sectional view of an illumination optical system 3a and is a ray diagram depicting an on-axis flux and an off-axis flux used for an observation that utilizes a first objective with a magnification of 4× and a numerical aperture of 0.16;

FIG. 5B is a sectional view of the illumination optical system 3a and is a ray diagram depicting an on-axis flux and an off-axis flux used for an observation that utilizes a second objective with a magnification of 40× and a numerical aperture of 0.9;

FIG. 13A illustrates a radiance distribution on a region of a sample plane observed by using the first objective, the region being illuminated by a microscope illumination device according to example 8;

FIG. 13B illustrates a radiance distribution on the pupil plane of the first objective resulting when a sample plane is observed by using the first objective, the sample plane being illuminated by the microscope illumination device according to example 8;

FIG. 13C illustrates a radiance distribution on a region of a sample plane that is observed by using the second objective, the sample plane being illuminated by the microscope illumination device according to example 8;

FIG. 13D illustrates a radiance distribution on the pupil plane of the second objective resulting when a sample plane is observed by using the second objective, the sample plane being illuminated by the microscope illumination device according to example 8; and FIG. 13E illustrates a radiance distribution on an aperture stop surface of the microscope illumination device according to example 8.

DESCRIPTION OF THE EMBODIMENTS

In recent years, LED light sources that have a longer life and consume less power have been used more often as light sources for microscopes.

A white LED light source used in place of a halogen light source often has a plurality of LED chips. Similarly to a halogen light source, a white LED light source having a plurality of LED chips may lead to illumination unevenness due to a non-uniform luminance distribution on the light-emitting surface. Also, illumination using an LED light source typically tends to result in insufficient luminance on a sample plane in comparison with illumination using a halogen light source. This makes it more difficult for a microscope illumination device having a white LED light source to provide bright and even illumination than for a microscope illumination device having a halogen light source.

Hereinafter, the embodiments of the present invention will be explained.

Figure 3:
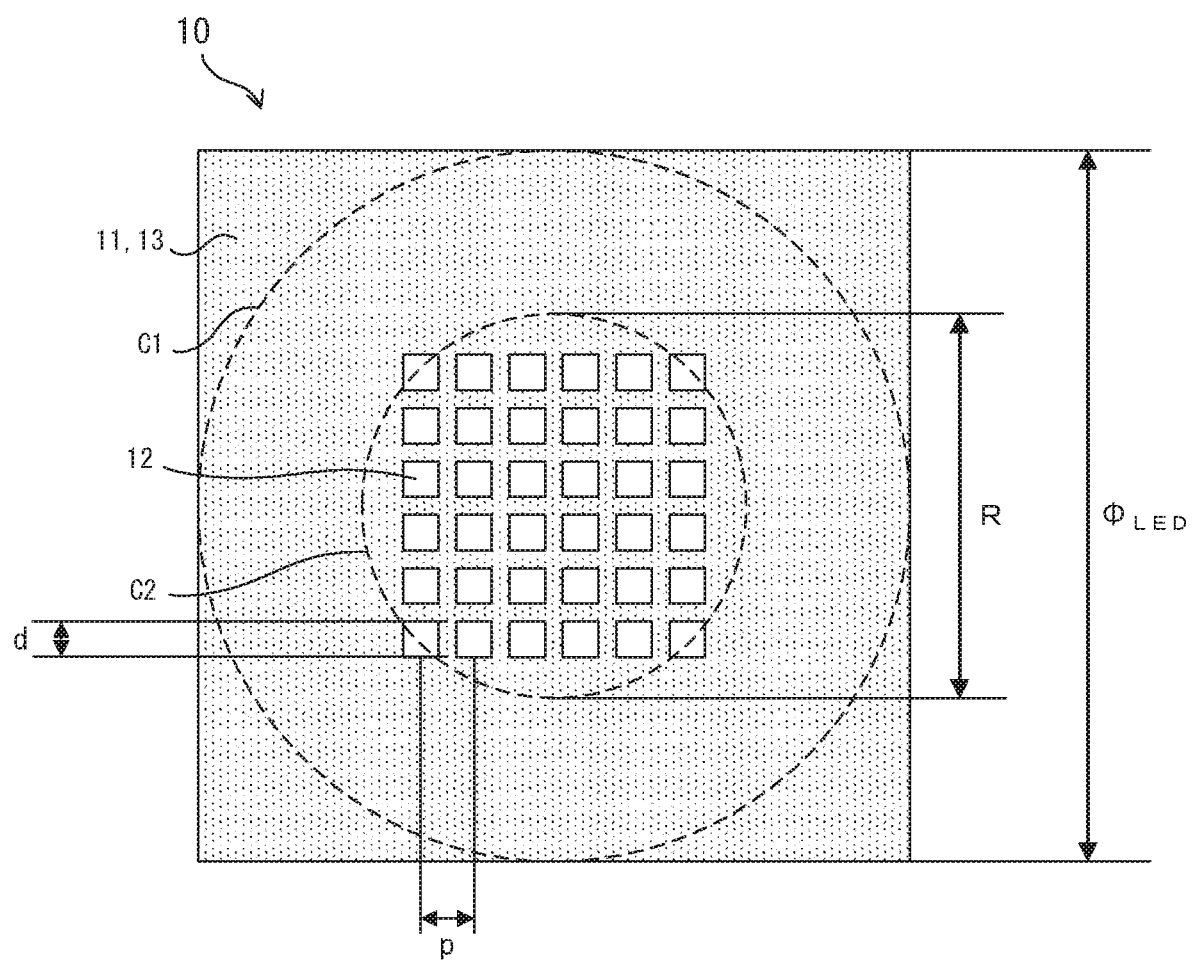
FIG. 3 exemplifies an array of LED chips 12 in the white LED light source 10.

FIG. 1 exemplifies a configuration of a microscope 1. FIG. 2 schematically illustrates a section of a white LED light source 10. FIG. 3 exemplifies an array of LED chips 12 in the white LED light source 10.

The microscope 1 illustrated in FIG. 1 is an upright microscope, and includes a microscope illumination device 2 that is provided with the white LED light source 10. The user of the microscope 1 can make a visual observation of sample S, mounted on a stage 90, through an eyepiece 130 or can pick up an image of sample S by using an image pickup element 140.

The microscope illumination device 2 is an illumination device that illuminates sample S by Kohler illumination. The microscope illumination device 2 includes the white LED light source 10 and an illumination optical system 3 that irradiates sample S, which is a subject of the observation, with light from the white LED light source 10.

The white LED light source 10 is a white LED light source of a so-called COB (Chips on Board) type. As illustrated in FIG. 2, the white LED light source 10 includes a substrate 11, the plurality of LED chips 12 that are arrayed on the substrate 11 and that emit excitation light, and a fluorescent substance layer 13 that is provided to cover the plurality of LED chips 12. The fluorescent substance layer 13 includes for example three types of fluorescent substances (a fluorescent substance 13a, a fluorescent substance 13b and a fluorescent substance 13c). While an example in which the fluorescent substance layer 13 includes three types of fluorescent substances will be explained hereinafter, the number of the types of fluorescent substances included in the fluorescent substance layer 13 is not limited to three. In order for the white LED light source 10 to radiate white light, it is desirable that the fluorescent substance layer 13 include at least three types of fluorescent substances.

The plurality of LED chips 12 are arrayed in such a manner that when an aperture stop 70 included in the illumination optical system 3 is in an open state, the plurality of LED chips 12 are projected inside the aperture of the aperture stop 70. Specifically, for example, they are arrayed in a configuration with six rows and six columns on the substrate 11 as illustrated in FIG. 3. Also, the open state refers to a state in which the aperture stop 70 is opened to its maximum level and in which the diameter of the aperture (which will be referred to as an aperture diameter hereinafter) of the aperture stop 70 is maximum. While the array of the plurality of LED chips 12 is not limited to the example illustrated in FIG. 3, it is desirable that the plurality of LED chips 12 be arrayed, on the substrate 11, in a configuration with M rows and N columns (M and N are integers equal to or greater than four, respectively).

Each of the plurality of LED chips 12 is for example an LED chip that emits excitation light in the near-ultraviolet region. Each of the three types of the fluorescent substances included in the fluorescent substance layer 13 is for example a fluorescent substance that generates fluorescence in the visible light region. Each of the three types of the fluorescent substances is excited by excitation light in the near-ultraviolet region emitted from the LED chips 12 or excited by visible light generated by a different fluorescent substance excited by excitation light in the near-ultraviolet region. The three types of the fluorescent substances emit beams of fluorescence having different wavelengths in the visible light region. It is particularly desirable that they emit beams of fluorescence having wavelengths corresponding to R (Red), G (Green) and B (Blue).

The white LED light source 10 emits white light in which the three types of fluorescence and excitation light are mixed. It is desirable that the white light emitted from the white LED light source 10 have an optical spectrum distribution that is similar to an optical spectrum distribution resulting when light from a halogen light source is combined with a daylight color (white) filter through color mixture.

The illumination optical system 3 includes a collector lens 20, a diffusion plate 30, a field stop 40, a mirror 50, a relay lens 60, the aperture stop 70, and a condenser lens 80. The field stop 40 and the aperture stop 70 have variable apertures, which have variable aperture diameters. The illumination optical system 3 is arranged so as to illuminate sample S by Kohler illumination.

The collector lens 20 is arranged between the white LED light source 10 and the diffusion plate 30, condenses light emitted from the white LED light source 10, and guides the light to the diffusion plate 30. The diffusion plate 30 is an example of light diffusion elements that diffuse light, and is for example a diffusion plate of a frost filter type. A diffusion plate of an arbitrary type can be used as the diffusion plate 30. The diffusion plate 30 is arranged on the white LED light source 10 side of the field stop 40, i.e., between the white LED light source 10 and the field stop 40 so that the diffusion plate 30 does not hinder the adjustment of illumination scope (illumination field) performed by the field stop 40.

When the diffusion plate 30 is too close to the field stop 40, a pattern of the diffusion plate 30 may be projected onto a sample plane. Thus, it is desirable that the diffusion plate 30 be arranged apart from the field stop 40 to some extent. It is desirable for example that the diffusion plate 30 be arranged closer to the collector lens 20 than to the field stop 40.

The field stop 40 is a diaphragm for adjusting the illumination scope (illumination field) and is arranged at a position that is optically conjugate with a sample plane (the back-side focal plane of the condenser lens 80). By changing the aperture diameter of the field stop 40, the illumination scope (illumination field) can be changed. Note that the back-side focal plane of the condenser lens 80 is a focal plane that is closer to sample S than the condenser lens 80 is, from among focal planes of the condenser lens 80.

The light that has passed through the field stop 40 is reflected by the mirror 50 and enters the relay lens 60. The relay lens 60 arranged between the field stop 40 and the aperture stop 70 condenses the light that has passed through the field stop 40 to the plane on which the aperture stop 70 is arranged, and forms an image of the white LED light source 10 (light source image). The condenser lens 80 irradiates sample S with the light from the light source image.

The aperture stop 70 is a diaphragm for adjusting the numerical aperture for illumination light with which sample S is irradiated, and is arranged in such a manner that the field stop 40 is positioned between the diffusion plate 30 and the aperture stop 70. In more detail, the aperture stop 70 is arranged on the front-side focal plane (hereinafter, the plane on which the aperture stop is located will be referred to as an AS plane) of the condenser lens 80, the front-side focal plane being at a position that is optically conjugate with the white LED light source 10. By changing the aperture diameter of the aperture stop 70, the numerical aperture for the illumination light with which sample S is irradiated can be changed. Note that the front-side focal plane of the condenser lens 80 is a focal plane that is closer to the white LED light source 10 than the condenser lens 80 is, from among focal planes of the condenser lens 80.

The condenser lens 80 is arranged in such a manner that the aperture stop 70 is positioned between the relay lens 60 and the condenser lens 80. The condenser lens 80 has a numerical aperture of 0.9 and illuminates the illumination scope that corresponds to for example the field of view of the microscope 1 used when an objective with a magnification of 4× is arranged on the optical path. Note that the numerical aperture of the condenser lens 80 is a maximum numerical aperture for illumination light that can be emitted through the condenser lens 80.

In addition to the microscope illumination device 2, the microscope 1 includes objectives (an objective 100 and an objective 101), an tube lens 110, a prism 120, the eyepiece 130 and the image pickup element 140.

The objectives 100 and 101 are infinity-corrected objectives that are used while being switched by a revolver (not illustrated). The objective 100 and objective 101 condense the light from sample S and emit an infinity light flux. The objective 100 is for example an objective with a magnification of 40× and a numerical aperture of 0.9. The objective 101 is for example an objective with a magnification of 4× and a numerical aperture of 0.16. The tube lens 110 condenses the infinity light flux emitted from an objective arranged on the optical path, and forms an image of sample S.

The prism 120 guides the light from the tube lens 110 to at least one of the observation optical path that leads to the eyepiece 130 and the detection optical path that leads to the image pickup element 140. The prism 120 may be for example a splitter that splits entering light at a prescribed ratio of the amount of the light. Also, the prism 120 may be an optical path switching mechanism that inserts and removes the entirety or part of the prism 120 with respect to the optical axis of the objective so as to switch the optical path through which the entering light travels.

The eyepiece 130 projects the image of sample S, formed by the tube lens 110, onto an eye of the user of the microscope 1. The user looks into the eyepiece 130, and thereby can perform a visible observation of sample S.

The image pickup element 140 is arranged on the image plane on which the image of sample S is formed by the tube lens 110. The image pickup element 140 is for example a charge coupled device (CCD) image sensor, a complementary metal oxide semiconductor (CMOS) image sensor, etc. On the basis of a signal output from the image pickup element 140, image data of sample S is generated by an image process device (not illustrated).

The microscope illumination device 2 and the microscope 1 satisfy conditional expression (1) below.

$$0.2 < d/p < 1 \tag{1}$$

In the conditional expression, p is a minimum interval between the centers of the plurality of LED chips 12. d is the size of each of the plurality of LED chips 12. Note that the size of the LED chip 12 is the length of a short side when the LED chip 12 is rectangular, and is the diameter when the LED chip 12 is circular. Also, as illustrated in FIG. 3, when the plurality of LED chips 12 have an identical size and are arrayed at a consistent pitch, p is also a pitch at which the plurality of LED chips 12 are arrayed.

Conditional expression (1) expresses a relationship between the size of the LED chip 12, which is a light emitting unit, and a distance between adjacent LED chips 12. In order to provide even illumination to a sample plane by Kohler illumination, it is desirable that the uniformity of the luminance distribution be high on the AS plane. When d/p is higher than the upper limit, the LED chips 12 are arrayed without gaps. Also, when d/p is lower than the lower limit, the intervals between the LED chips 12 are too long with respect to the size of the LED chip 12. Therefore, in order to eliminate the non-uniformity of the luminance distribution on the AS plane onto which the image of the white LED light source 10 (which will simply be referred to as a light source image hereinafter) is projected, a light diffusion element with high diffusivity is used as the diffusion plate 30. This increases the loss in the amount of the light on the diffusion plate 30, deteriorating the illumination efficiency. Accordingly, it is difficult to achieve both the illumination efficiency and the uniformity of illumination at a high level.

By satisfying conditional expression (1), it is possible to illuminate the AS plane uniformly by using the diffusion plate 30 having relatively low diffusivity. Note that the diffusivity is a capacity of alight diffusion element to diffuse light. The higher the diffusivity of a light diffusion element is, the wider the scope over which it can diffuse light is.

The microscope illumination device 2 and the microscope 1 having the above configurations make it possible to form a luminance distribution on the AS plane with high uniformity by using the diffusion plate 30 having relatively low diffusivity. This makes it possible to evenly illuminate a sample plane by Kohler illumination by using white light from the white LED light source 10 while suppressing the loss in the amount of the light on the diffusion plate 30. Thus, according to the microscope illumination device 2 and the microscope 1, both the illumination efficiency and the uniformity of illumination can be achieved at a high level.

Next, explanations will be given for conditions that are desirably to be satisfied by the microscope illumination device 2 and the microscope 1. It is desirable that the microscope illumination device 2 satisfy conditional expressions (2) and (3) below.

$$(p-d)/(2 \times F_{co}) \leq NA1 \times F_{cd}/F_{rl} \tag{2}$$

$$NA1/NA \leq \frac{1}{3} \tag{3}$$

In the expressions, $F_{co}$ is the focal length of the collector lens 20. $F_{rl}$ is the focal length of the relay lens 60. $F_{cd}$ is the focal length of the condenser lens 80. NA is the numerical aperture of the condenser lens 80. NA1 is the numerical aperture of an objective having a magnification that corresponds to the maximum illumination scope of the condenser lens 80.

Conditional expression (2) expresses a relationship between the size of the image of a non-light-emitting section and the size of a region in which a light beam passes through the pupil plane of the condenser lens 80, the light beam being a light beam contributing to an observation (i.e., a light beam that contributes to the formation of the sample image), and this region will hereinafter be referred to as a contribution region, meaning that the region contributes to an observation. The image of a non-light-emitting section is formed on the pupil plane of the condenser lens 80. In this example, the pupil plane of the condenser lens 80 is the above described AS plane. Also, the non-light-emitting section is an interval portion between the LED chips 12. When conditional expression (2) is not satisfied, the size of the image of the non-light-emitting section is greater than that of the contribution region, and accordingly there is a possibility that the image of a light-emitting section does not exist at all in the contribution region. This makes it difficult to provide bright illumination particularly when an objective with a low magnification is used.

Note that the user of the microscope 1 can observe sample S by using objectives with various magnifications, sample S being illuminated by the microscope illumination device 2. The size of the contribution region described above depends upon the numerical aperture of an objective that is used, and the lower the numerical aperture of the objective is, the smaller the size is. Generally, the lower the magnification of an objective is, the smaller the numerical aperture of the objective is, and accordingly the lower the magnification of an objective that is used is, the smaller the size of the contribution region is. The objective with the lowest magnification among objectives that are expected to be used for the microscope 1 is the objective with the highest magnification among objectives that can be used for observing the entirety of the maximum illumination scope of the microscope illumination device 2 (such an objective will be referred to as an objective corresponding to the maximum illumination scope of the microscope illumination device 2 hereinafter). Accordingly, as expressed by conditional expression (2), when the size of the contribution region (i.e., $2 \times NA1 \times F_{co}$), which is calculated on the basis of the numerical aperture of the objective corresponding to the maximum illumination scope of the microscope illumination device 2, is equal to or greater than the size of the image of the non-light-emitting section (i.e., $(p-d) \times F_{rt}/F_{cd}$), the size of the contribution region in an arbitrary objective that is used in the microscope 1 is equal to or greater than that of the image of the non-light-emitting section.

Conditional expression (3) expresses a relationship between the numerical aperture of the objective with the lowest magnification that among objectives that are expected to be used for the microscope 1 and the numerical aperture of the condenser lens 80. When conditional expression (3) is not satisfied, the numerical aperture of the condenser lens 80 may sometimes be insufficient depending upon an objective that is used, making it impossible to fully deliver the performance of the objective. In particular, it is difficult to provide bright illumination when an objective with a high magnification is used.

By satisfying conditional expression (2) and conditional expression (3), the microscope illumination device 2 and the microscope 1 can provide excellent illumination regardless of an objective that is used in the microscope 1. In other words, the microscope 1 can provide bright illumination by using objectives with magnifications ranging from a low magnification to a high magnification.

Also, it is desirable that the microscope illumination device 2 satisfy conditional expression (4) below.

$$\tfrac{1}{2} \times \tan^{-1}((p-d)/F_{co}) \leq \theta \leq 6 \times \tan^{-1}((p-d)/F_{co}) \quad (4)$$

In the expression, $\theta$ is the scattering angle (which will be referred to as a diffusion angle hereinafter) of diffused light that is emitted from the diffusion plate 30, the scattering angle being an angle at which the diffused light is emitted from the diffusion plate 30 with the intensity that is ½ of that of the diffused light emitted in the traveling direction of the entering light. Note that the scattering angle is an angle between the traveling direction of the entering light and the angle of the outgoing light.

The table below illustrates relationships between the scattering angles and the emission intensities for the diffusion plates 30 with the diffusion angles of 0.6 degrees, 1.2 degrees, 4 degrees and 9 degrees. The intensities in the table are the intensities of outgoing light that are standardized in such a manner that the intensity of a light beam emitted in the direction at a scattering angle of zero degrees is 1.

TABLE 1

| $\theta$ = 0.6 DEGREES | | $\theta$ = 1.2 DEGREES | | $\theta$ = 4 DEGREES | | $\theta$ = 9 DEGREES | |
|---|---|---|---|---|---|---|---|
| SCATTERING ANGLE | INTENSITY | SCATTERING ANGLE | INTENSITY | SCATTERING ANGLE | INTENSITY | SCATTERING ANGLE | INTENSITY |
| 0 | 1 | 0 | 1 | 0 | 1 | 0 | 1 |
| 0.125 | 0.88049 | 0.5 | 0.94381 | 0.5 | 0.9998 | 2.5 | 0.91989 |
| 0.25 | 0.81963 | 1 | 0.61636 | 1 | 0.99266 | 5 | 0.80704 |
| 0.375 | 0.68743 | 1.5 | 0.36219 | 1.5 | 0.93869 | 7.5 | 0.62605 |
| 0.5 | 0.60884 | 2 | 0.20867 | 2 | 0.86981 | 10 | 0.44067 |
| 0.625 | 0.45122 | 2.5 | 0.11196 | 2.5 | 0.81188 | 12.5 | 0.34475 |
| 0.75 | 0.37294 | 3 | 0.05848 | 3 | 0.71955 | 15 | 0.23168 |
| 0.875 | 0.29681 | 3.5 | 0.03412 | 3.5 | 0.62358 | 17.5 | 0.17142 |
| 1 | 0.21373 | 4 | 0.01935 | 4 | 0.5071 | 20 | 0.11991 |
| 1.125 | 0.16006 | 4.5 | 0.01019 | 4.5 | 0.45774 | 22.5 | 0.08201 |
| 1.25 | 0.1222 | 5 | 0.00627 | 5 | 0.39882 | 25 | 0.05875 |
| 1.375 | 0.0903 | 5.5 | 0.00501 | 5.5 | 0.30435 | 27.5 | 0.03482 |
| 1.5 | 0.0624 | 6 | 0.00423 | 6 | 0.27618 | 30 | 0.02443 |
| 1.625 | 0.04705 | 6.5 | 0.00396 | 6.5 | 0.22828 | 32.5 | 0.01686 |
| 1.75 | 0.03295 | 7 | 0.00512 | 7 | 0.18382 | 35 | 0.01213 |
| 1.875 | 0.02226 | 7.5 | 0.00543 | 7.5 | 0.15153 | 37.5 | 0.00849 |
| 2 | 0.01755 | 8 | 0.00582 | 8 | 0.12102 | 40 | 0.00569 |
| 2.125 | 0.01171 | 8.5 | 0.00624 | 8.5 | 0.10035 | 42.5 | 0.00339 |
| 2.25 | 0.00772 | 9 | 0.00625 | 9 | 0.09053 | 45 | 0.00232 |
| 2.375 | 0.00604 | 9.5 | 0.00669 | 9.5 | 0.06883 | 47.5 | 0.00164 |
| 2.5 | 0.00345 | 10 | 0.00707 | 10 | 0.05921 | 50 | 0.00085 |
| 2.625 | 0.00224 | 10.5 | −0.0003 | | | 52.5 | 0.00113 |
| 2.75 | 0.00199 | 11 | 0.00062 | | | 55 | 0.00137 |
| 2.875 | 0.00123 | 11.5 | 0.00198 | | | 57.5 | 0.00051 |
| 3 | 0.00036 | 12 | 0.00151 | | | 60 | 0.00023 |
| 3.125 | 0.0012 | 12.5 | 0.00212 | | | 62.5 | 0.00025 |
| 3.25 | 0.00116 | 13 | 0.00172 | | | 65 | 0.00095 |

TABLE 1-continued

| θ = 0.6 DEGREES | | θ = 1.2 DEGREES | | θ = 4 DEGREES | | θ = 9 DEGREES | |
|---|---|---|---|---|---|---|---|
| SCATTERING ANGLE | INTENSITY | SCATTERING ANGLE | INTENSITY | SCATTERING ANGLE | INTENSITY | SCATTERING ANGLE | INTENSITY |
| 3.375 | 0.00111 | 13.5 | 0.0018 | | | 67.5 | 0.00064 |
| 3.5 | 0.0012 | 14 | 0.00193 | | | 70 | 0.00058 |
| | | 14.5 | 0.00265 | | | | |
| | | 15 | 0.00292 | | | | |

Figure 4:
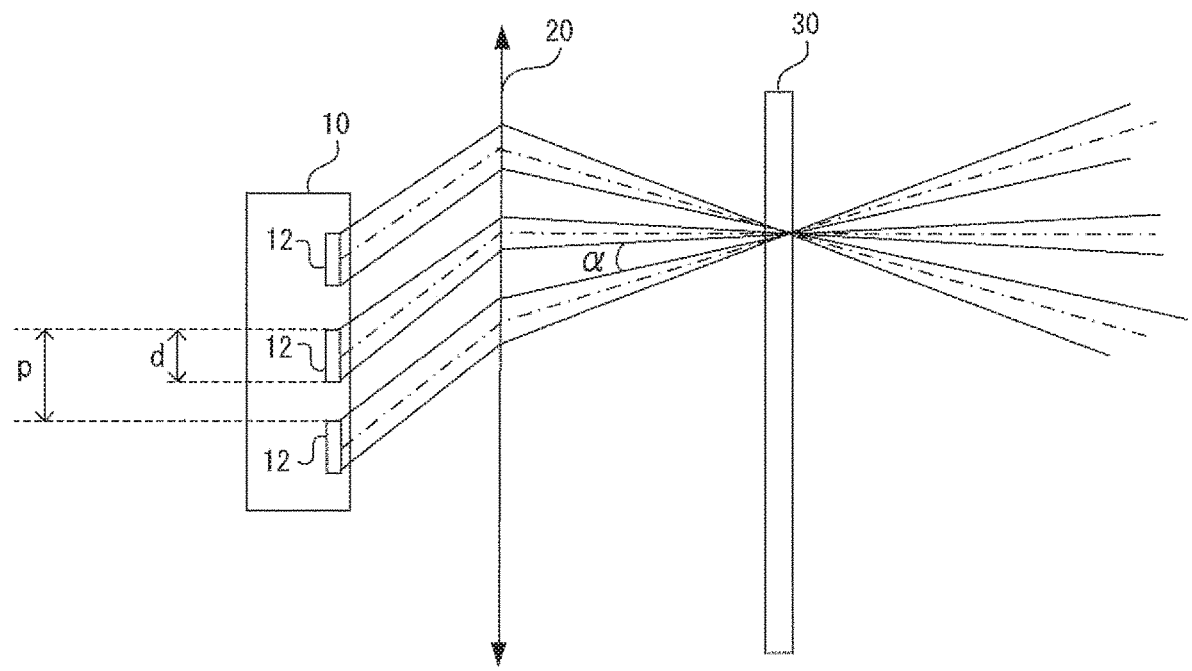
FIG. 4 explains an angle formed by a region which is between two light fluxes entering the diffusion plate 30 from two adjacent LED chips 12 and in which these light fluxes do not pass.

Conditional expression (4) expresses a relationship between a state of a light flux that enters the diffusion plate 30 and a diffusion angle of the diffusion plate 30. As illustrated in FIG. 4, parallel light fluxes that were emitted from two adjacent LED chips 12 at certain angles enter the diffusion plate 30 at different angles. Angle α formed by a region which is between these light fluxes and in which these light fluxes do not pass is expressed by $\tan^{-1}((p-d)/F_{co})$, where $F_{co}$ is the focal length of the collector lens 20, p is the pitch of the array of the LED chips 12 and d is the size of the LED chip 12. In other words, when angle α is used, conditional expression (4) can also be expressed as conditional expression (4-1).

$$\alpha/2 \leq \theta \leq 6 \times \Delta \quad (4\text{-}1)$$

When θ is lower than α/2, the diffusion of the light on the diffusion plate 30 is insufficient, and accordingly the angular dependence of the intensity of light entering the AS plane is not sufficiently suppressed. This prevents the elimination of the non-uniformity of the luminance distribution on the AS plane, the non-uniformity of the luminance distribution being caused by the non-uniformity of the intensity of the entering light with respect to the angle of incidence. Also, there is a risk that the resolution of the microscope 1 and the imaging performance of the microscope 1 for observations may deteriorate. When θ is higher than 6×α, the angular dependence of the intensity of the light entering the AS plane is eliminated. However, the diffusion plate 30 diffuses light to a large extent, increasing a loss in the amount of the light.

By satisfying conditional expression (4), excessive diffusion of light on the diffusion plate 30 can be prevented. This makes it possible to increase the uniformity of the luminance distribution on the AS plane while further suppressing the loss in the amount of the light on the diffusion plate 30. Thereby, the microscope 1 can achieve both the illumination efficiency and the uniformity of illumination at an even higher level.

Also, it is desirable that the microscope illumination device 2 satisfy conditional expression (5) below.

$$NA \times F_{cd}/F_{rl} < R/(2 \times F_{co}) + \sin\theta \quad (5)$$

In the expression, R is the diameter of minimum circle C2 including the plurality of LED chips 12. Note that "including the plurality of LED chips 12" means "including all the center positions of the plurality of LED chips 12" as illustrated in FIG. 3.

Conditional expression (5) expresses a relationship between an angle of incidence on the diffusion plate 30 and an angle of incidence on the diffusion plate 30 of the light beam that travels from the white LED light source 10 toward the diffusion plate 30. The angle of incidence on the diffusion plate 30 is angle of incidence of a light beam when the light beam corresponding to the numerical aperture of the condenser lens 80 is inversely traced from sample S toward the diffusion plate 30. The left-hand member of conditional expression (5) is a result of multiplying the numerical aperture (NA) of the condenser lens 80 by the magnification with which sample S is projected onto the field stop 40, that is the magnification ($F_{cd}/F_{rl}$). In other words, the left-hand member is the numerical aperture on the white LED light source 10 side of the optical system including the condenser lens 80 and the relay lens 60. Specifically, the left-hand member represents an angle at which a light beam corresponding to the numerical aperture of the condenser lens 80 is emitted from the diffusion plate 30. The first term of the right-hand member of conditional expression (5) represents an angle at which a light beam enters the diffusion plate 30 from the LED chip 12 that is arranged closest to the edge of the array. The second term of the right-hand member of conditional expression (5) represents the diffusion angle of the diffusion plate 30. In other words, the right-hand member of conditional expression (5) represents a representative angle at which a light beam is emitted from the diffusion plate 30, the light beam being a light beam that has come from the LED chip 12 arranged closest to the edge of the array. When conditional expression (5) is not satisfied, the microscope illumination device 2 cannot guide, to sample S, the light beam corresponding to the numerical aperture of the condenser lens 80. This makes it impossible to fully deliver the performance of the condenser lens 80.

By satisfying conditional expression (5), it is possible to irradiate sample S with a light beam corresponding to the numerical aperture of the condenser lens 80. This makes it possible to illuminate sample S brightly. Also, by using the diffusion plate 30 with small diffusion angle θ in a range in which conditional expression (5) is satisfied, a loss in the amount of light can further be suppressed.

Also, it is desirable that the microscope illumination device 2 satisfy conditional expression (6) below.

$$0.5 \leq R/\varphi_{LED} \quad (6)$$

In the expression, $\varphi_{LED}$ is the diameter of circle C1 that is inscribed in the fluorescent substance layer 13 as illustrated in FIG. 3.

Conditional expression (6) expresses a ratio, to the region of the white LED light source 10, of a region in which the plurality of LED chips 12 are arranged. The white LED light source 10 emits light from the entire surface of the fluorescent substance layer 13. However, the white LED light source 10 tends to have high luminance in a surface portion corresponding to a region having the LED chips 12 and have low luminance in a surface portion corresponding to a region not having the LED chips 12. Because of this, the uniformity of the luminance on the light-emitting surface (i.e., the entire surface of the fluorescent substance layer 13) depends upon the arrangement of the LED chips 12.

When $R/\varphi_{LED}$ is lower than the lower limit value, the plurality of LED chips 12 concentrate in a partial region such as for example a region around the center of the white LED light source 10. This leads to the formation of a non-uniform luminance distribution with high luminance in a narrow scope around the center of the light-emitting surface and low luminance around that scope. A luminance distribution such as this reduces the substantial size of the light source image. Also, when the interval between the white LED light source 10 and the collector lens 20 varies due to a manufacturing error, illumination unevenness appears noticeably on the low magnification side. Because of this, even when a large white LED light source 10 is used, it is not possible to fully utilize the size of the light-emitting surface of that white LED light source 10. In other words, this results in a situation where the illumination is limited to illumination based on a numerical aperture smaller than the maximum numerical aperture that can be achieved by the condenser lens 80 or leads to influence on illumination unevenness on the low magnification side.

By satisfying conditional expression (6), the luminance distribution on the light-emitting surface can have uniformity appropriate for illumination, and bright illumination can be provided with a large numerical aperture by forming an appropriate light source image at the aperture stop position of the condenser lens. Also, even when the interval between the white LED light source 10 and the collector lens 20 varies due to a manufacturing error, the influence of illumination unevenness under a low-magnification condition can be suppressed, and bright illumination can be achieved by utilizing the size of the white LED light source 10.

Hereinafter, explanations will be given for the examples. The configurations of the microscope illumination devices according to the respective examples are similar to that of the microscope illumination device 2 except that they have different arrays, pitches and sizes for a plurality of LED chips in a white LED light source and they have different diffusion angles of diffusion plates.

EXAMPLE 1

FIG. 5A and FIG. 5B are sectional views of an illumination optical system 3a included in the microscope illumination device 2a according to the present example. FIG. 5A is a ray diagram depicting the on-axis flux and the off-axis flux used for an observation that uses an objective with a magnification of 4× and a numerical aperture of 0.16 (which will be referred to as a first objective). FIG. 5B is a ray diagram depicting the on-axis flux and the off-axis flux used for an observation that uses an objective with a magnification of 40× and a numerical aperture of 0.9 (which will be referred to as a second objective). Note that the field number is 22 in both of the diagrams.

As illustrated in FIG. 5A and FIG. 5B, the microscope illumination device 2a includes a white LED light source 10a and the illumination optical system 3a. The white LED light source 10a is a white LED light source of a COB (Chip on Boards) type. The white LED light source 10a is similar to the white LED light source 10 in that it includes a substrate, a plurality of LED chips that are arrayed on the substrate and that emit excitation light, and a fluorescent substance layer provided to cover the plurality of LED chips.

The white LED light source 10a includes a total of 16 LED chips that are arranged in a configuration of 4×4 on the substrate. The specification of the white LED light source 10a is as below.

M=4, N=4, p=2 mm, d=0.6 mm, $\varphi_{LED}$=12 mm and R=9.3 mm

The illumination optical system 3a is similar to the illumination optical system 3 except that it includes a diffusion plate 30a instead of the diffusion plate 30. Note that the collector lens 20 includes plano-convex lens L7, biconvex lens L6 and plano-convex lens L5 in order starting from the white LED light source 10a side, plano-convex lens L7 having the planar surface on the light source side and plano-convex lens L5 having the planar surface on the light source side. Also, the relay lens 60 is a cemented lens including meniscus lens L4 and biconvex lens L3 in order starting from the white LED light source 10a side, meniscus lens L4 having the convex surface on the light source side. The condenser lens 80 includes meniscus lens L2 and plano-convex lens L1 in order starting from the white LED light source 10a side, meniscus lens L2 having the convex surface on the light source side and plano-convex lens L1 having the convex surface on the light source side. Note that the objective with a magnification corresponding to the maximum illumination scope of the condenser lens 80 is the first objective.

The data of the illumination optical system 3a is as below.
$\theta=4°$, $F_{co}=25.4$ mm, NA=0.9, $F_{cd}=15.2$ mm, $F_{rl}=93.95$ mm and NA1=0.16

The lens data of the illumination optical system 3a is as below, where INF represents infinity ($\infty$) and * marks beside surface numbers represent that the surfaces corresponding to the surface numbers are aspheric surfaces.

illumination optical system 3a

| s | r | d | nd | vd |
|---|---|---|---|---|
| 0 | INF | | | |
| 1 | INF | 1.2 | 1.5233 | 58.93 |
| 2 | INF | 0.4677 | | |
| 3 | INF | 15.8 | 1.56883 | 56.36 |
| 4 | −10.5 | 4.2 | | |
| 5 | −97.9 | 8 | 1.70154 | 41.24 |
| 6 | −22.237 | 5.8 | | |
| 7 | INF | 80.7323 | | |
| 8 | 57.25 | 12.5 | 1.51633 | 64.14 |
| 9 | −40.124 | 4 | 1.6727 | 32.1 |
| 10 | −117.339 | 29.5 | | |
| 11 | INF | 56 | | |
| 12 | INF | 70 | | |
| 13 | INF | 1 | 1.49236 | 57.86 |
| 14 | INF | 2 | | |
| 15 | 164.838 | 3.5 | 1.58423 | 30.49 |
| 16 | INF | 1 | | |
| 17* | 80.5 | 9.5 | 1.49236 | 57.86 |
| 18 | −58 | 0.75 | | |
| 19* | 20.5938 | 10 | 1.49236 | 57.86 |
| 20 | INF | 17.1764 | | |
| 21 | INF | | | |

In the data s represents a surface number, r represents a curvature radius (mm), d represents a distance between surfaces (mm), nd represents a refractive index with respect to a d line, and vd represents an Abbe number. The surface numbers are assigned in order starting from the sample S side. Surface numbers s0, s1 and s2 respectively represent a sample plane, the surface of cover glass CG facing the sample S side and the surface of cover glass CG facing the illumination optical system 3a side. Surface numbers s3 and s20 respectively represent the surface of the illumination optical system 3a closest to sample S and the surface of the illumination optical system 3a closest to the white LED light source 10. Surface number s21 represents the light-emitting surface of the white LED light source 10.

The illumination optical system 3a has aspheric surface data as below. The aspheric shape is expressed by the following expression. In the expression, Z is the coordinate in the optical axis direction on the aspheric surface, X, Y is the coordinates in the direction that is orthogonal to the optical axis of the aspheric surface, K is a conic constant, R is a paraxial curvature radius on the aspheric surface, and A4, A6, A8 and A10 are fourth-order, sixth-order, eighth-order and tenth-order aspheric coefficients, respectively. E is a power of ten.

$$Z = \frac{CUY \cdot S^2}{1 + \sqrt{1 - (K+1) \cdot CUY^2 \cdot S^2}} +$$
$$A2 \cdot S^2 + A4 \cdot S^4 + A6 \cdot S^6 + A8 \cdot S^8 + A10 \cdot S^{10}$$

$$S^2 = X^2 + Y^2$$

$$CUY = 1/r$$

17th surface s17
r=80.5, K=−1, A2=0, A4=3.45E−06, A6=−1.08E−08, A8=9.63E−12, A10=0
19th surface s19
r=20.5938, K=−1, A2=0, A4=2.62E−06, A6=−2.60E−08, A8=6.84E−12, A10=0

The microscope illumination device 2a according to the present example satisfies conditional expressions (1) through (6) as described below.

| (1) | d/p = 0.3 |
|---|---|
| (2) left-hand member | $(p − d)/(2 × F_{co})$ = 0.028 |
| (2) right-hand member | $NA1 × F_{cd}/F_{r1}$ = 0.146 |
| (3) | NA1/NA = 0.177 |
| (4) left-hand member | $\frac{1}{2} × \tan^{-1}((p − d)/F_{co})$ = 1.58 |
| (4) | θ = 4 |
| (4) right-hand member | $6 × \tan^{-1}((p − d)/F_{co})$ = 18.93 |
| (5) left-hand member | $NA × F_{cd}/F_{r1}$ = 0.146 |
| (5) right-hand member | $R/(2 × F_{co}) + \sin θ$ = 0.253 |
| (6) | $R/φ_{LED}$ = 0.775 |

Figure 6A:
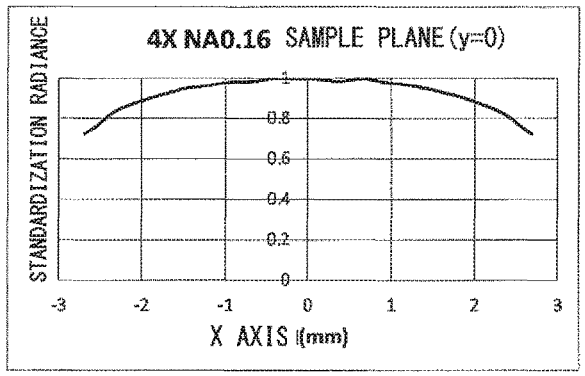
FIG. 6A illustrates a radiance distribution on a region of a sample plane observed by using the first objective, the sample plane being illuminated by a microscope illumination device according to example 1.
Figure 6B:
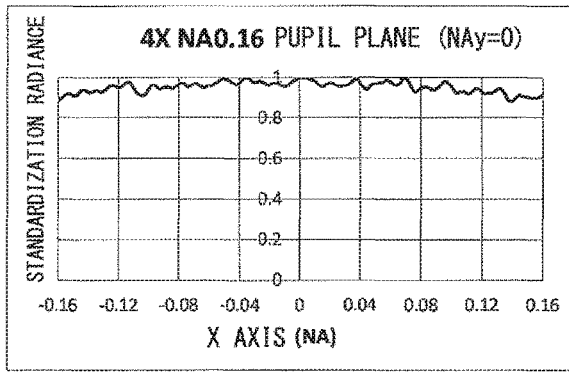
FIG. 6B illustrates a radiance distribution on the pupil plane of the first objective resulting when a sample plane is observed by using the first objective, the sample plane being illuminated by the microscope illumination device according to example 1.
Figure 6C:
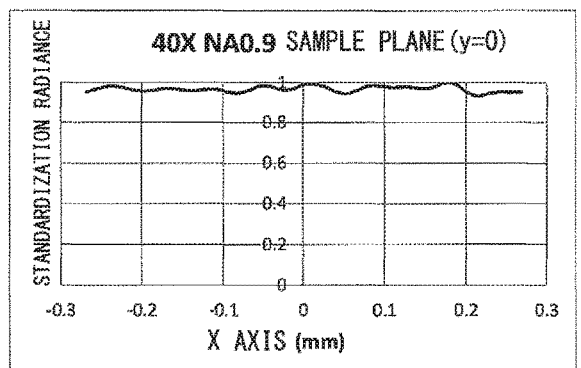
FIG. 6C illustrates a radiance distribution on a region of a sample plane observed by using the second objective, the sample plane being illuminated by the microscope illumination device according to example 1.
Figure 6D:
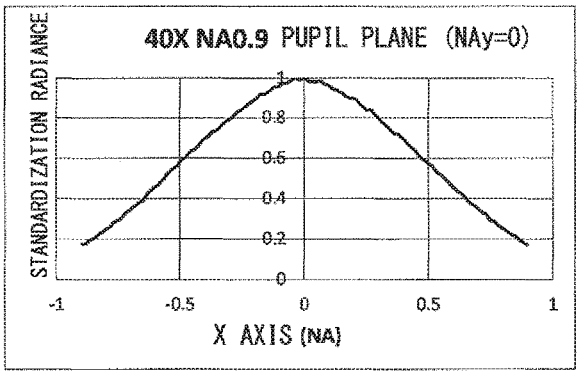
FIG. 6D illustrates a radiance distribution on the pupil plane of the second objective resulting when a sample plane is observed by using the second objective, the sample plane being illuminated by the microscope illumination device according to example 1.
Figure 6E:
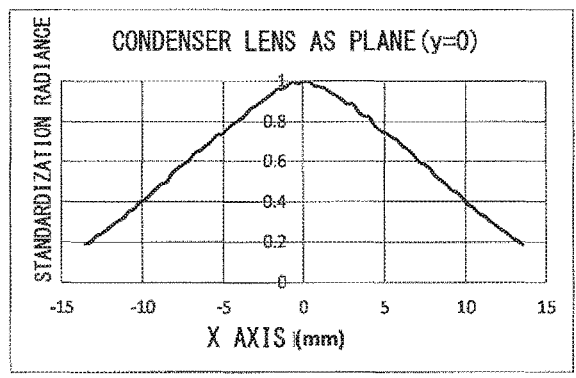
FIG. 6E illustrates a radiance distribution on an aperture stop surface of the microscope illumination device according to example 1.

FIG. 6A through FIG. 6E illustrate the radiance distributions on the respective surfaces resulting when sample S is illuminated by using a microscope that includes the microscope illumination device 2a according to the present example. FIG. 6A and FIG. 6B illustrate radiance distributions resulting when the microscope uses the first objective for an observation. FIG. 6A illustrates a radiance distribution in a region of a sample plane, and FIG. 6B illustrates a radiance distribution on the pupil plane of the first objective. FIG. 6C and FIG. 6D illustrate radiance distributions resulting when the microscope uses the second objective for an observation. FIG. 6C illustrates a radiance distribution in a region of a sample plane, and FIG. 6D illustrates a radiance distribution on the pupil plane of the second objective. FIG. 6E illustrates a radiance distribution on the AS plane of the microscope illumination device 2a. In all of these figures, the horizontal axis represents a position on the plane and the vertical axis represents radiance that is standardized in such a manner that the maximum value is 1. A position on the pupil plane is expressed by using the NA of a light beam that passes through that position.

The total amounts and the maximum luminance of the light emitted to the region of the field of view when the first objective and the second objective are used respectively are as below.

When the first objective is used: the total amount of light is 1.58 W and the maximum luminance is 80.9 mW/m²

When the second objective is used: total amount of light is 0.042 W and the maximum luminance is 146.2 mW/m²

Note that the total amounts of light and the maximum luminance above are calculated through an illumination simulation performed under the following conditions. The conditions will also apply to the other examples.

All the LED chips each have an output of 1 W.

The luminance distributions on the light-emitting surfaces of the LED chips are uniform and the angular characteristics are Lambertian characteristics.

Fluorescence from the fluorescent substance layer is not taken into consideration.

The correlated color temperature of the white light is 6500K.

As explained in FIG. 6A through FIG. 6E and in the above result, the microscope illumination device 2a makes it possible to provide bright illumination while uniformly illuminating a wide illumination scope. Thus, both the illumination efficiency and the uniformity of illumination can be achieved at a high level by using a white LED light source.

EXAMPLE 2

The microscope illumination device according to the present example is different in that a diffusion plate with a diffusion angle of 9 degrees is provided instead of the diffusion plate 30a with diffusion angle θ of 4 degrees. The microscope illumination device according to the present example is similar to the microscope illumination device 2a in the other aspects.

The microscope illumination device according to the present example satisfies conditional expressions (1) through (6) as described below.

| (1) | d/p = 0.3 |
|---|---|
| (2) left-hand member | $(p − d)/(2 × F_{co})$ = 0.028 |
| (2) right-hand member | $NA1 × F_{cd}/F_{r1}$ = 0.146 |
| (3) | NA1/NA = 0.177 |
| (4) left-hand member | $\frac{1}{2} × \tan^{-1}((p − d)/F_{co})$ = 1.58 |
| (4) | θ = 9 |
| (4) right-hand member | $6 × \tan^{-1}((p − d)/F_{co})$ = 18.93 |
| (5) left-hand member | $NA × F_{cd}/F_{r1}$ = 0.146 |
| (5) right-hand member | $R/(2 × F_{co}) + \sin θ$ = 0.34 |
| (6) | $R/φ_{LED}$ = 0.775 |

Figure 7A:
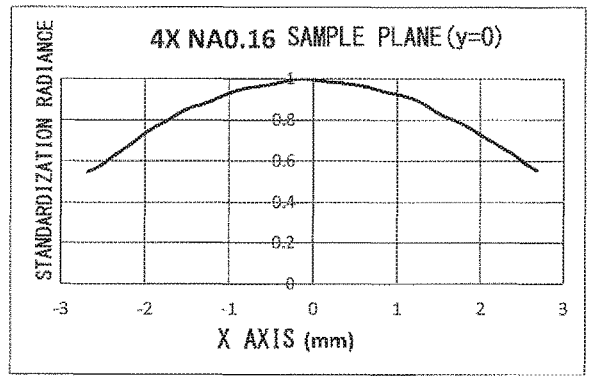
FIG. 7A illustrates a radiance distribution on a region of a sample plane observed by using the first objective, the sample plane being illuminated by a microscope illumination device according to example 2.
Figure 7B:
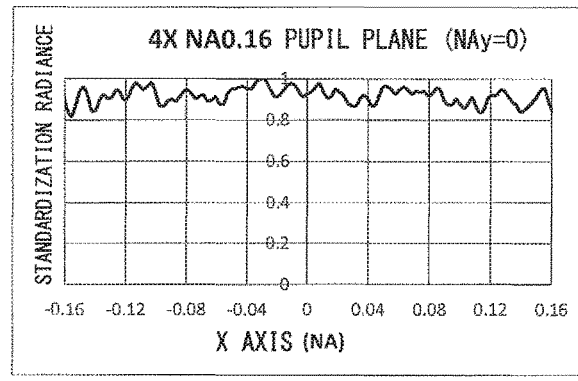
FIG. 7B illustrates a radiance distribution on the pupil plane of the first objective resulting when a sample plane is observed by using the first objective, the sample plane being illuminated by the microscope illumination device according to example 2.
Figure 7C:
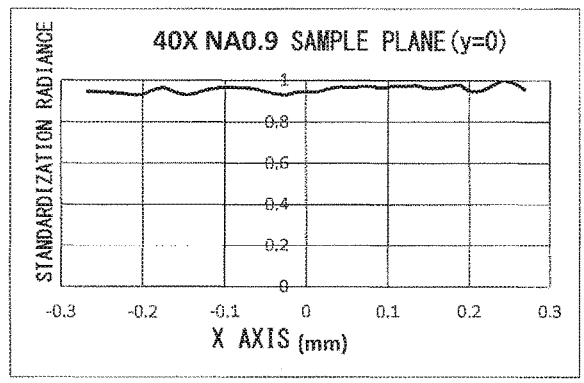
FIG. 7C illustrates a radiance distribution on a region of a sample plane that is observed by using the second objective, the sample plane being illuminated by the microscope illumination device according to example 2.
Figure 7D:
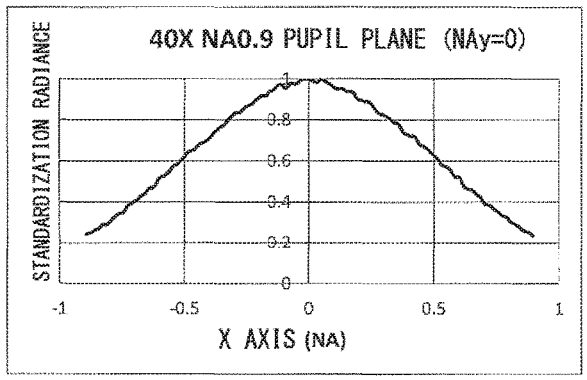
FIG. 7D illustrates a radiance distribution on the pupil plane of the second objective resulting when a sample plane is observed by using the second objective, the sample plane being illuminated by the microscope illumination device according to example 2.
Figure 7E:
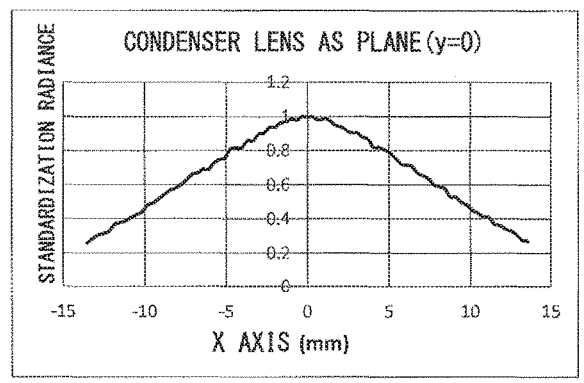
FIG. 7E illustrates a radiance distribution on an aperture stop surface of the microscope illumination device according to example 2.

FIG. 7A through FIG. 7E illustrate the radiance distributions on the respective surfaces resulting when sample S is illuminated by using a microscope that includes the microscope illumination device according to the present example. FIG. 7A and FIG. 7B illustrate radiance distributions resulting when the microscope uses the first objective for an observation. FIG. 7A illustrates a radiance distribution in a region of a sample plane, and FIG. 7B illustrates a radiance distribution on the pupil plane of the first objective. FIG. 7C and FIG. 7D illustrate radiance distributions resulting when the microscope uses the second objective for an observation. FIG. 7C illustrates a radiance distribution in a region of a sample plane, and FIG. 7D illustrates a radiance distribution on the pupil plane of the second objective. FIG. 7E illustrates a radiance distribution on the AS plane of the microscope illumination device according to the present example. In all of these figures, the horizontal axis represents a position on the plane and the vertical axis represents radiance that is standardized in such a manner that the maximum value is 1. A position on the pupil plane is expressed by using the NA of a light beam that passes through that position.

The total amounts and the maximum luminance of the light emitted to the region of the field of view when the first objective and the second objective are used respectively are as below.

When the first objective is used: the total amount of light is 0.103 W and the maximum luminance is 5.2 mW/m²

When the second objective is used: total amount of light is 0.0164 W and the maximum luminance is 59.2 mW/m²

As explained in FIG. 7A through FIG. 7E and in the above result, the microscope illumination device according to the present example makes it possible to provide bright illumination while uniformly illuminating a wide illumination scope. Thus, both the illumination efficiency and the uniformity of illumination can be achieved at a high level by using a white LED light source.

EXAMPLE 3

The microscope illumination device according to the present example is different from the microscope illumination device 2a in that it is provided with a diffusion plate with a diffusion angle of 1.2 degrees instead of the diffusion plate 30a with diffusion angle θ of 4 degrees and with a white LED light source according to the following specification instead of the white LED light source 10a. The microscope illumination device according to the present example is similar to the microscope illumination device 2a in the other aspects.

M=6, N=6, p=1 mm, d=0.3 mm, $\varphi_{LED}$=9 mm and R=7.5 mm

The microscope illumination device according to the present example satisfies conditional expressions (1) through (6) as described below.

| | |
|---|---|
| (1) | d/p = 0.3 |
| (2) left-hand member | (p − d)/(2 × $F_{co}$) = 0.014 |
| (2) right-hand member | NA1 × $F_{cd}/F_{r1}$ = 0.146 |
| (3) | NA1/NA = 0.177 |
| (4) left-hand member | ½ × tan⁻¹((p − d)/$F_{co}$) = 0.79 |
| (4) | θ = 1.2 |
| (4) right-hand member | 6 × tan⁻¹((p − d)/$F_{co}$) = 9.47 |
| (5) left-hand member | NA × $F_{cd}/F_{r1}$ = 0.146 |
| (5) right-hand member | R/(2 × $F_{co}$) + sinθ = 0.169 |
| (6) | R/$\varphi_{LED}$ = 0.833 |

Figure 8A:
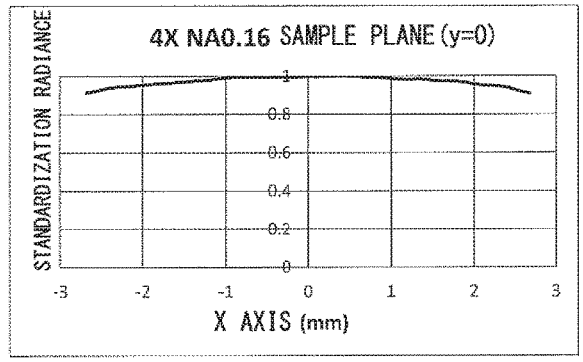
FIG. 8A illustrates a radiance distribution on a region of a sample plane observed by using the first objective, the sample plane being illuminated by a microscope illumination device according to example 3.
Figure 8B:
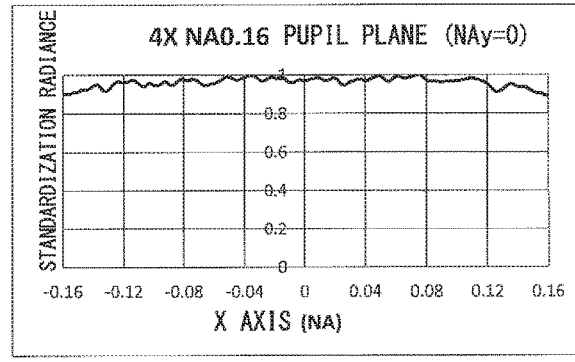
FIG. 8B illustrates a radiance distribution on the pupil plane of the first objective resulting when a sample plane is observed by using the first objective, the sample plane being illuminated by the microscope illumination device according to example 3.
Figure 8C:
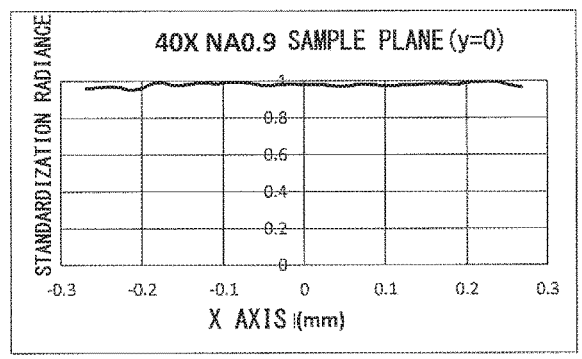
FIG. 8C illustrates a radiance distribution on a region of a sample plane that is observed by using the second objective, the sample plane being illuminated by the microscope illumination device according to example 3.
Figure 8D:
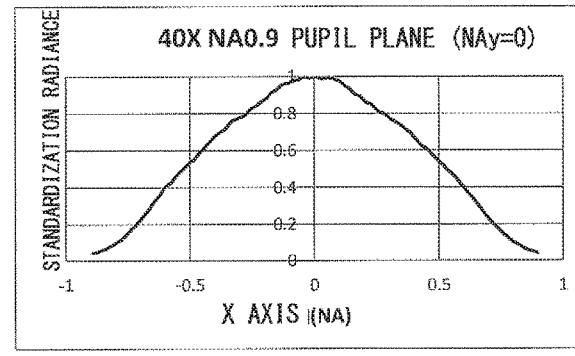
FIG. 8D illustrates a radiance distribution on the pupil plane of the second objective resulting when a sample plane is observed by using the second objective, the sample plane being illuminated by the microscope illumination device according to example 3.
Figure 8E:
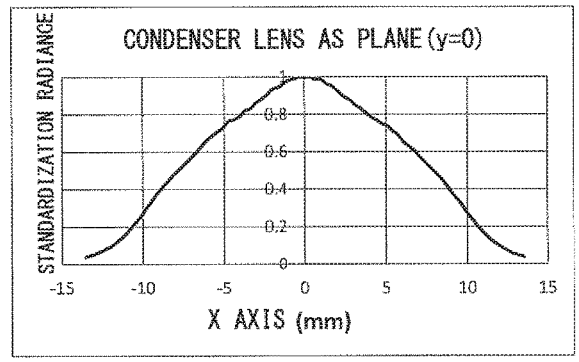
FIG. 8E illustrates a radiance distribution on an aperture stop surface of the microscope illumination device according to example 3.

FIG. 8A through FIG. 8E illustrate the radiance distributions on the respective surfaces resulting when sample S is illuminated by using a microscope that includes the microscope illumination device according to the present example. FIG. 8A and FIG. 8B illustrate radiance distributions resulting when the microscope uses the first objective for an observation. FIG. 8A illustrates a radiance distribution in a region of a sample plane, and FIG. 8B illustrates a radiance distribution on the pupil plane of the first objective. FIG. 8C and FIG. 8D illustrate radiance distributions resulting when the microscope uses the second objective for an observation. FIG. 8C illustrates a radiance distribution in a region of a sample plane, and FIG. 8D illustrates a radiance distribution on the pupil plane of the second objective. FIG. 8E illustrates a radiance distribution on the AS plane of the microscope illumination device according to the present example. In all of these figures, the horizontal axis represents a position on the plane and the vertical axis represents radiance that is standardized in such a manner that the maximum value is 1. A position on the pupil plane is expressed by using the NA of a light beam that passes through that position.

The total amounts and the maximum luminance of the light emitted to the region of the field of view when the first objective and the second objective are used respectively are as below.

When the first objective is used: the total amount of light is 1.279 W and the maximum luminance is 47.5 mW/m²

When the second objective is used: total amount of light is 0.139 W and the maximum luminance is 479.4 mW/m²

As explained in FIG. 8A through FIG. 8E and in the above result, the microscope illumination device according to the present example makes it possible to provide bright illumination while uniformly illuminating a wide illumination scope. Thus, both the illumination efficiency and the uniformity of illumination can be achieved at a high level by using a white LED light source.

EXAMPLE 4

The microscope illumination device according to the present example is different from the microscope illumination device according to example 3 in that a diffusion plate with a diffusion angle of 4 degrees is provided instead of the diffusion plate with diffusion angle θ of 1.2 degrees. The microscope illumination device according to the present example is similar to the microscope illumination device according to example 3 in the other aspects.

The microscope illumination device according to the present example satisfies conditional expressions (1) through (6) as described below.

| | |
|---|---|
| (1) | d/p = 0.3 |
| (2) left-hand member | (p − d)/(2 × $F_{co}$) = 0.014 |
| (2) right-hand member | NA1 × $F_{cd}/F_{r1}$ = 0.146 |
| (3) | NA1/NA = 0.177 |
| (4) left-hand member | ½ × tan⁻¹((p − d)/$F_{co}$) = 0.79 |
| (4) | θ = 4 |
| (4) right-hand member | 6 × tan⁻¹((p − d)/$F_{co}$) = 9.47 |
| (5) left-hand member | NA × $F_{cd}/F_{r1}$ = 0.146 |
| (5) right-hand member | R/(2 × $F_{co}$) + sinθ = 0.217 |
| (6) | R/$\varphi_{LED}$ = 0.833 |

Figure 9A:
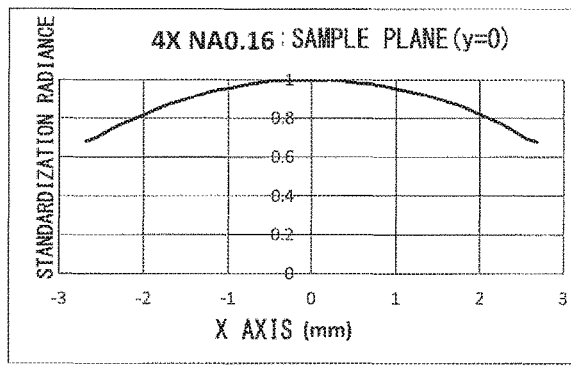
FIG. 9A illustrates a radiance distribution on a region of a sample plane observed by using the first objective, the sample plane being illuminated by a microscope illumination device according to example 4.
Figure 9B:
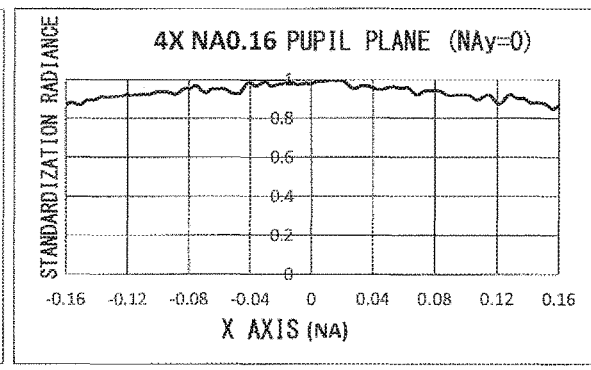
FIG. 9B illustrates a radiance distribution on the pupil plane of the first objective resulting when a sample plane is observed by using the first objective, the sample plane being illuminated by the microscope illumination device according to example 4.
Figure 9C:
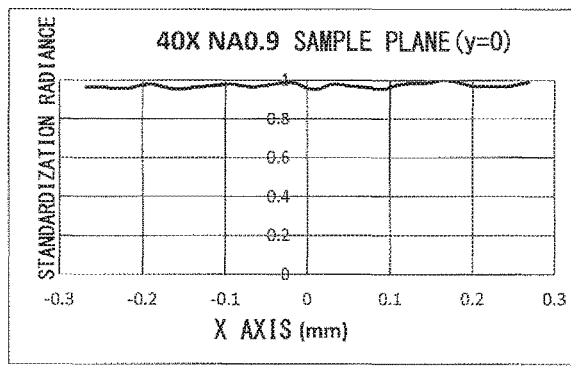
FIG. 9C illustrates a radiance distribution on a region of a sample plane that is observed by using the second objective, the sample plane being illuminated by the microscope illumination device according to example 4.
Figure 9D:
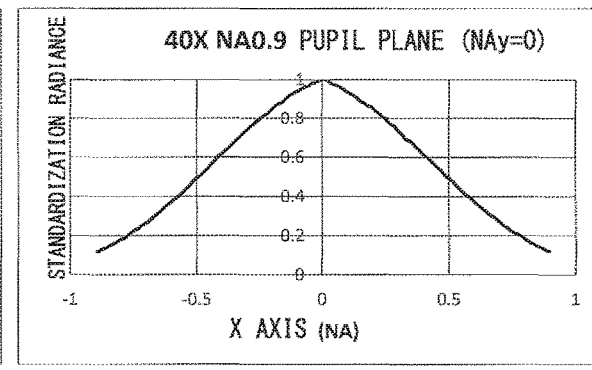
FIG. 9D illustrates a radiance distribution on the pupil plane of the second objective resulting when a sample plane is observed by using the second objective, the sample plane being illuminated by the microscope illumination device according to example 4.
Figure 9E:
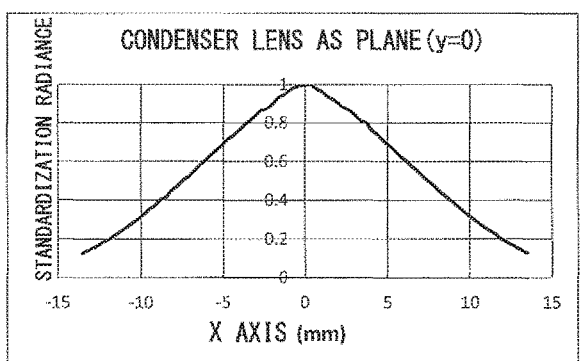
FIG. 9E illustrates a radiance distribution on an aperture stop surface of the microscope illumination device according to example 4.

FIG. 9A through FIG. 9E illustrate the radiance distributions on the respective surfaces resulting when sample S is illuminated by using a microscope that includes the microscope illumination device according to the present example. FIG. 9A and FIG. 9B illustrate radiance distributions resulting when the microscope uses the first objective for an observation. FIG. 9A illustrates a radiance distribution in a region of a sample plane, and FIG. 9B illustrates a radiance distribution on the pupil plane of the first objective. FIG. 9C and FIG. 9D illustrate radiance distributions resulting when the microscope uses the second objective for an observation. FIG. 9C illustrates a radiance distribution in a region of a sample plane, and FIG. 9D illustrates a radiance distribution on the pupil plane of the second objective. FIG. 9E illustrates a radiance distribution on the AS plane of the microscope illumination device according to the present example. In all of these figures, the horizontal axis represents a position on the plane and the vertical axis represents radiance that is standardized in such a manner that the maximum value is 1. A position on the pupil plane is expressed by using the NA of a light beam that passes through that position.

The total amounts and the maximum luminance of the light emitted to the region of the visual field range when the first objective and the second objective are used respectively are as below.

When the first objective is used: the total amount of light is 1.0332 W and the maximum luminance is 45.6 mW/m²

When the second objective is used: total amount of light is 0.125 W and the maximum luminance is 432.9 mW/m²

As explained in FIG. 9A through FIG. 9E and in the above result, the microscope illumination device according to the present example makes it possible to provide bright illumination while uniformly illuminating a wide illumination scope. Thus, both the illumination efficiency and the uniformity of illumination can be achieved at a high level by using a white LED light source.

EXAMPLE 5

The microscope illumination device according to the present example is different from the microscope illumination device according to example 3 in that a diffusion plate with a diffusion angle of 9 degrees is provided instead of the diffusion plate with diffusion angle θ of 1.2 degrees. The microscope illumination device according to the present example is similar to the microscope illumination device according to example 3 in the other aspects.

The microscope illumination device according to the present example satisfies conditional expressions (1) through (6) as described below.

| (1) | $d/p = 0.3$ |
|---|---|
| (2) left-hand member | $(p - d)/(2 \times F_{co}) = 0.014$ |
| (2) right-hand member | $NA1 \times F_{cd}/F_{r1} = 0.146$ |
| (3) | $NA1/NA = 0.177$ |
| (4) left-hand member | $\frac{1}{2} \times \tan^{-1}((p - d)/F_{co}) = 0.79$ |
| (4) | $\theta = 9$ |
| (4) right-hand member | $6 \times \tan^{-1}((p - d)/F_{co}) = 9.47$ |
| (5) left-hand member | $NA \times F_{cd}/F_{r1} = 0.146$ |
| (5) right-hand member | $R/(2 \times F_{co}) + \sin\theta = 0.304$ |
| (6) | $R/\varphi_{LED} = 0.833$ |

Figure 10A:
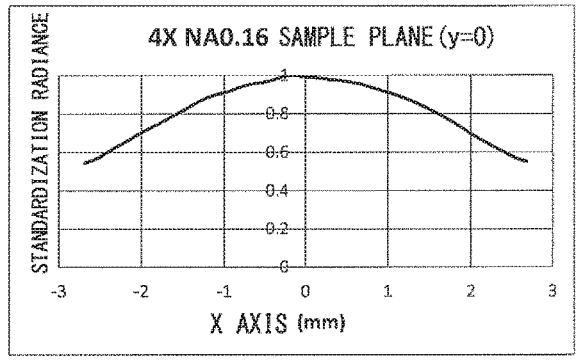
FIG. 10A illustrates a radiance distribution on a region of a sample plane observed by using the first objective, the sample plane being illuminated by a microscope illumination device according to example 5.
Figure 10B:
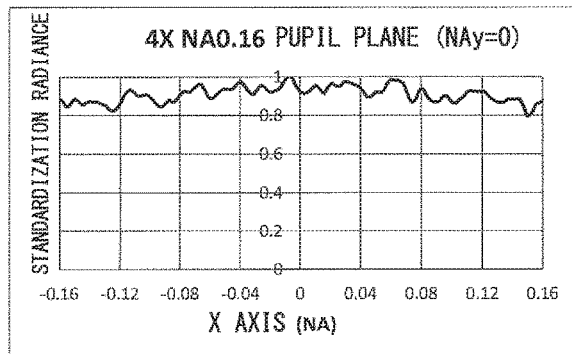
FIG. 10B illustrates a radiance distribution on the pupil plane of the first objective resulting when a sample plane is observed by using the first objective, the sample plane being illuminated by the microscope illumination device according to example 5.
Figure 10C:
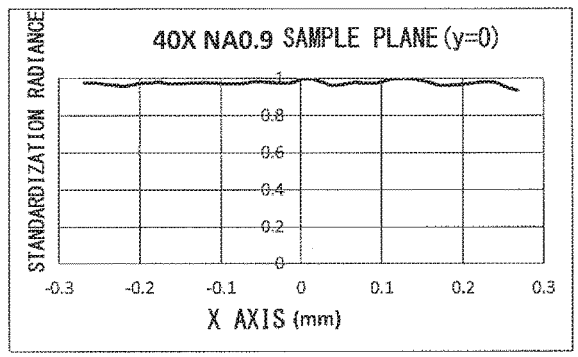
FIG. 10C illustrates a radiance distribution on a region of a sample plane that is observed by using the second objective, the sample plane being illuminated by the microscope illumination device according to example 5.
Figure 10D:
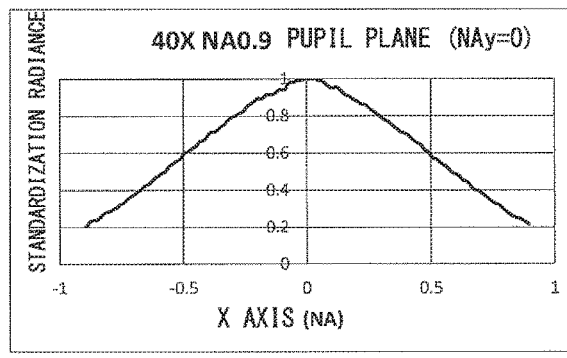
FIG. 10D illustrates a radiance distribution on the pupil plane of the second objective resulting when a sample plane is observed by using the second objective, the sample plane being illuminated by the microscope illumination device according to example 5.
Figure 10E:
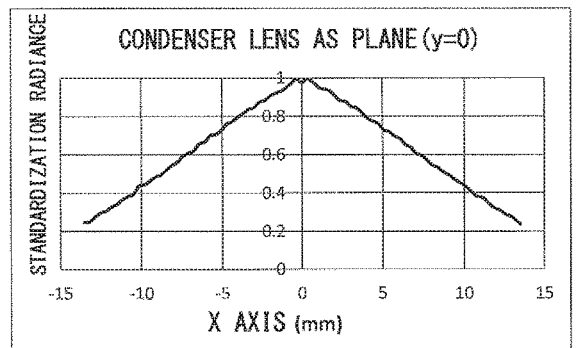
FIG. 10E illustrates a radiance distribution on an aperture stop surface of the microscope illumination device according to example 5.

FIG. 10A through FIG. 10E illustrate the radiance distributions on the respective surfaces resulting when sample S is illuminated by using a microscope that includes the microscope illumination device according to the present example. FIG. 10A and FIG. 10B illustrate radiance distributions resulting when the microscope uses the first objective for an observation. FIG. 10A illustrates a radiance distribution in a region of a sample plane, and FIG. 10B illustrates a radiance distribution on the pupil plane of the first objective. FIG. 10C and FIG. 10D illustrate radiance distributions resulting when the microscope uses the second objective for an observation. FIG. 10C illustrates a radiance distribution in a region of a sample plane, and FIG. 10D illustrates a radiance distribution on the pupil plane of the second objective. FIG. 10E illustrates a radiance distribution on the AS plane of the microscope illumination device according to the present example. In all of these figures, the horizontal axis represents a position on the plane and the vertical axis represents radiance that is standardized in such a manner that the maximum value is 1. A position on the pupil plane is expressed by using the NA of a light beam that passes through that position.

The total amounts and the maximum luminance of the light emitted to the region of the field of view when the first objective and the second objective are used respectively are as below.

When the first objective is used: the total amount of light is 0.265 W and the maximum luminance is 13.4 mW/m²

When the second objective is used: total amount of light is 0.041 W and the maximum luminance is 143.4 mW/m²

As explained in FIG. 10A through FIG. 10E and in the above result, the microscope illumination device according to the present example makes it possible to provide bright illumination while uniformly illuminating a wide illumination scope. Thus, both the illumination efficiency and the uniformity of illumination can be achieved at a high level by using a white LED light source.

EXAMPLE 6

The microscope illumination device according to the present example is different from the microscope illumination device 2a in that it is provided with a diffusion plate with a diffusion angle of 0.6 degrees instead of the diffusion plate 30a with diffusion angle θ of 4 degrees and that it is provided with a white LED light source according to the following specification instead of the white LED light source 10a. The microscope illumination device according to the present example is similar to the microscope illumination device 2a in the other aspects.

M=10, N=10, p=0.5 mm, d=0.2 mm, $\varphi_{LED}$=9 mm and R=6.6 mm

The microscope illumination device according to the present example satisfies conditional expressions (1) through (4) and (6) as described below.

| (1) | $d/p = 0.4$ |
|---|---|
| (2) left-hand member | $(p - d)/(2 \times F_{co}) = 0.006$ |
| (2) right-hand member | $NA1 \times F_{cd}/F_{r1} = 0.146$ |
| (3) | $NA1/NA = 0.177$ |
| (4) left-hand member | $\frac{1}{2} \times \tan^{-1}((p - d)/F_{co}) = 0.34$ |
| (4) | $\theta = 0.6$ |
| (4) right-hand member | $6 \times \tan^{-1}((p - d)/F_{co}) = 4.06$ |
| (5) left-hand member | $NA \times F_{cd}/F_{r1} = 0.146$ |
| (5) right-hand member | $R/(2 \times F_{co}) + \sin\theta = 0.140$ |
| (6) | $R/\varphi_{LED} = 0.733$ |

Figure 11A:
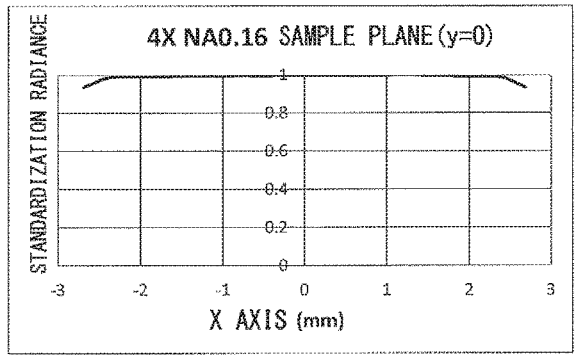
FIG. 11A illustrates a radiance distribution on a region of a sample plane observed by using the first objective, the sample plane being illuminated by a microscope illumination device according to example 6.
Figure 11B:
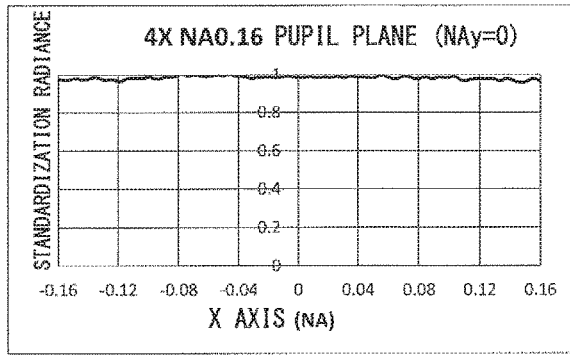
FIG. 11B illustrates a radiance distribution on the pupil plane of the first objective resulting when a sample plane is observed by using the first objective, the sample plane being illuminated by the microscope illumination device according to example 6.
Figure 11C:
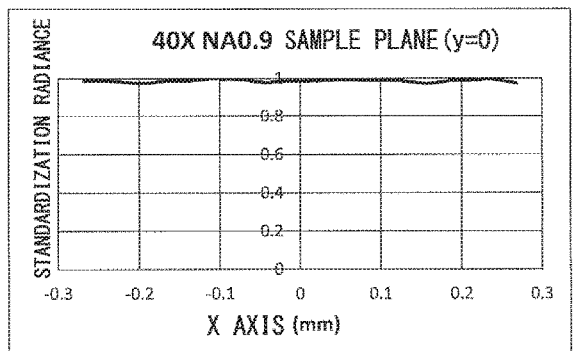
FIG. 11C illustrates a radiance distribution on a region of a sample plane that is observed by using the second objective, the sample plane being illuminated by the microscope illumination device according to example 6.
Figure 11D:
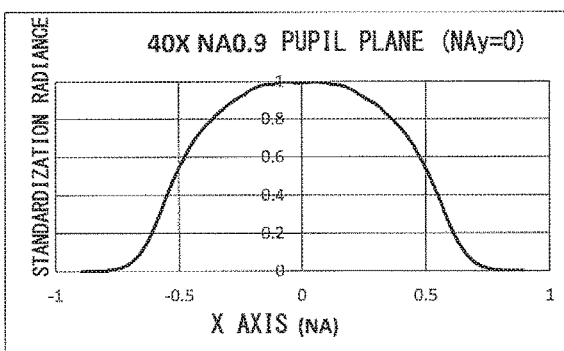
FIG. 11D illustrates a radiance distribution on the pupil plane of the second objective resulting when a sample plane is observed by using the second objective, the sample plane being illuminated by the microscope illumination device according to example 6.
Figure 11E:
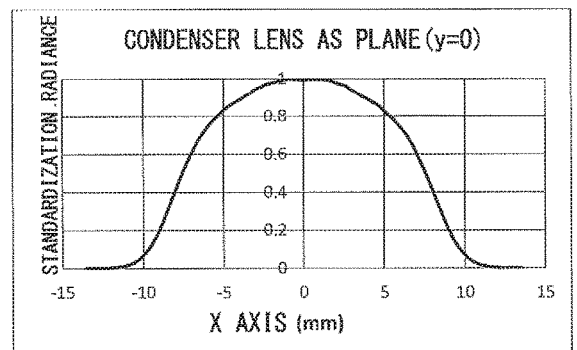
FIG. 11E illustrates a radiance distribution on an aperture stop surface of the microscope illumination device according to example 6.

FIG. 11A through FIG. 11E illustrate the radiance distributions on the respective surfaces resulting when sample S is illuminated by using a microscope that includes the microscope illumination device according to the present example. FIG. 11A and FIG. 11B illustrate radiance distributions resulting when the microscope uses the first objective for an observation. FIG. 11A illustrates a radiance distribution in a region of a sample plane, and FIG. 11B illustrates a radiance distribution on the pupil plane of the first objective. FIG. 11C and FIG. 11D illustrate radiance distributions resulting when the microscope uses the second objective for an observation. FIG. 11C illustrates a radiance distribution in a region of a sample plane, and FIG. 11D illustrates a radiance distribution on the pupil plane of the second objective. FIG. 11E illustrates a radiance distribution on the AS plane of the microscope illumination device according to the present example. In all of these figures, the horizontal axis represents a position on the plane and the vertical axis represents radiance that is standardized in such a manner that the maximum value is 1. A position on the pupil plane is expressed by using the NA of a light beam that passes through that position.

The total amounts and the maximum luminance of the light emitted to the region of the visual field range when the first objective and the second objective are used respectively are as below.

When the first objective is used: the total amount of light is 5.84 W and the maximum luminance is 220.0 mW/m²

When the second objective is used: total amount of light is 0.503 W and the maximum luminance is 1694 mW/m²

As explained in FIG. 11A through FIG. 11E and in the above result, the microscope illumination device according to the present example makes it possible to provide bright illumination while uniformly illuminating a wide illumination scope. Thus, both the illumination efficiency and the uniformity of illumination can be achieved at a high level by using a white LED light source.

EXAMPLE 7

The microscope illumination device according to the present example is different from the microscope illumination device according to example 6 in that a diffusion plate with a diffusion angle of 1.2 degrees is provided instead of a diffusion plate with diffusion angle θ of 0.6 degrees. The microscope illumination device according to the present example is similar to the microscope illumination device according to example 6 in the other aspects.

The microscope illumination device according to the present example satisfies conditional expressions (1) through (6) as described below.

| | |
|---|---|
| (1) | $d/p = 0.4$ |
| (2) left-hand member | $(p - d)/(2 \times F_{co}) = 0.006$ |
| (2) right-hand member | $NA1 \times F_{cd}/F_{r1} = 0.146$ |
| (3) | $NA1/NA = 0.177$ |
| (4) left-hand member | $\frac{1}{2} \times \tan^{-1}((p - d)/F_{co}) = 0.34$ |
| (4) | $\theta = 1.2$ |
| (4) right-hand member | $6 \times \tan^{-1}((p - d)/F_{co}) = 4.06$ |
| (5) left-hand member | $NA \times F_{cd}/F_{r1} = 0.146$ |
| (5) right-hand member | $R/(2 \times F_{co}) + \sin\theta = 0.151$ |
| (6) | $R/\varphi_{LED} = 0.733$ |

Figure 12A:
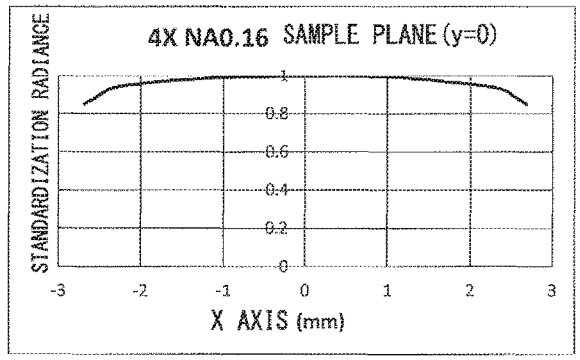
FIG. 12A illustrates a radiance distribution on a region of a sample plane observed by using the first objective, the sample plane being illuminated by a microscope illumination device according to example 7.
Figure 12B:
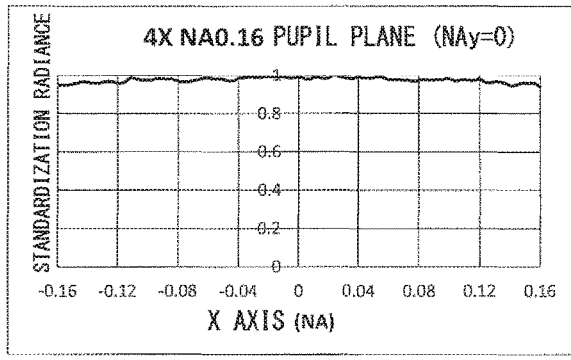
FIG. 12B illustrates a radiance distribution on the pupil plane of the first objective resulting when a sample plane is observed by using the first objective, the sample plane being illuminated by the microscope illumination device according to example 7.
Figure 12C:
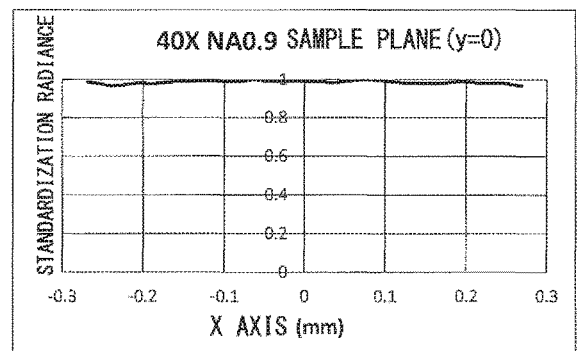
FIG. 12C illustrates a radiance distribution on a region of a sample plane that is observed by using the second objective, the sample plane being illuminated by the microscope illumination device according to example 7.
Figure 12D:
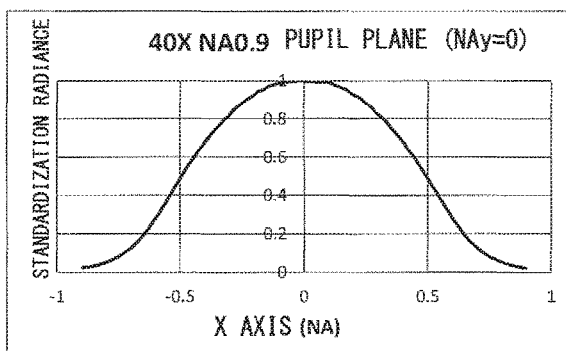
FIG. 12D illustrates a radiance distribution on the pupil plane of the second objective resulting when a sample plane is observed by using the second objective, the sample plane being illuminated by the microscope illumination device according to example 7.
Figure 12E:
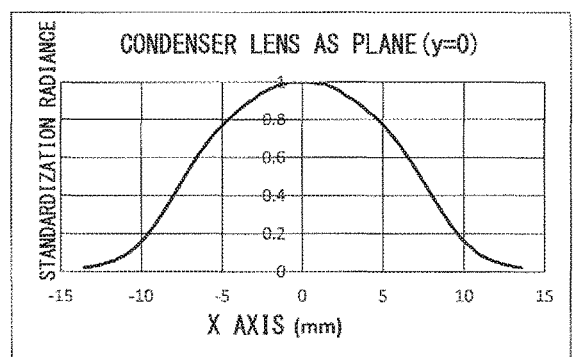
FIG. 12E illustrates a radiance distribution on an aperture stop surface of the microscope illumination device according to example 7.

FIG. 12A through FIG. 12E illustrate the radiance distributions on the respective surfaces resulting when sample S is illuminated by using a microscope that includes the microscope illumination device according to the present example. FIG. 12A and FIG. 12B illustrate radiance distributions resulting when the microscope uses the first objective for an observation. FIG. 12A illustrates a radiance distribution in a region of a sample plane, and FIG. 12B illustrates a radiance distribution on the pupil plane of the first objective. FIG. 12C and FIG. 12D illustrate radiance distributions resulting when the microscope uses the second objective for an observation. FIG. 12C illustrates a radiance distribution in a region of a sample plane, and FIG. 12D illustrates a radiance distribution on the pupil plane of the second objective. FIG. 12E illustrates a radiance distribution on the AS plane of the microscope illumination device according to the present example. In all of these figures, the horizontal axis represents a position on the plane and the vertical axis represents radiance that is standardized in such a manner that the maximum value is 1. A position on the pupil plane is expressed by using the NA of a light beam that passes through that position.

The total amounts and the maximum luminance of the light emitted to the region of the field of view when the first objective and the second objective are used respectively are as below.

When the first objective is used: the total amount of light is 4.61 W and the maximum luminance is 182.0 mW/m²

When the second objective is used: total amount of light is 0.424 W and the maximum luminance is 1434 mW/m²

As explained in FIG. 12A through FIG. 12E and in the above result, the microscope illumination device according to the present example makes it possible to provide bright illumination while uniformly illuminating a wide illumination scope. Thus, both the illumination efficiency and the uniformity of illumination can be achieved at a high level by using a white LED light source.

EXAMPLE 8

The microscope illumination device according to the present example is different from the microscope illumination device according to example 6 in that it includes a diffusion plate with a diffusion angle of 4 degrees instead of a diffusion plate with diffusion angle θ of 0.6 degrees. The microscope illumination device according to the present example is similar to the microscope illumination device according to example 6 in the other aspects.

The microscope illumination device according to the present example satisfies conditional expressions (1) through (6) as described below.

| | |
|---|---|
| (1) | $d/p = 0.4$ |
| (2) left-hand member | $(p - d)/(2 \times F_{co}) = 0.006$ |
| (2) right-hand member | $NA1 \times F_{cd}/F_{r1} = 0.146$ |
| (3) | $NA1/NA = 0.177$ |
| (4) left-hand member | $\frac{1}{2} \times \tan^{-1}((p - d)/F_{co}) = 0.34$ |
| (4) | $\theta = 4$ |
| (4) right-hand member | $6 \times \tan^{-1}((p - d)/F_{co}) = 4.06$ |
| (5) left-hand member | $NA \times F_{cd}/F_{r1} = 0.146$ |
| (5) right-hand member | $R/(2 \times F_{co}) + \sin\theta = 0.200$ |
| (6) | $R/\varphi_{LED} = 0.733$ |

FIG. 13A through FIG. 13E illustrate the radiance distributions on the respective surfaces resulting when sample S is illuminated by using a microscope that includes the microscope illumination device according to the present example. FIG. 13A and FIG. 13B illustrate radiance distributions resulting when the microscope uses the first objective for an observation. FIG. 13A illustrates a radiance distribution in a region of a sample plane, and FIG. 13B illustrates a radiance distribution on the pupil plane of the first objective. FIG. 13C and FIG. 13D illustrate radiance distributions resulting when the microscope uses the second objective for an observation. FIG. 13C illustrates a radiance distribution in a region of a sample plane, and FIG. 13D illustrates a radiance distribution on the pupil plane of the second objective. FIG. 13E illustrates a radiance distribution on the AS plane of the microscope illumination device according to the present example. In all of these figures, the horizontal axis represents a position on the plane and the vertical axis represents radiance that is standardized in such a manner that the maximum value is 1. A position on the pupil plane is expressed by using the NA of a light beam that passes through that position.

The total amounts and the maximum luminance of the light emitted to the region of the visual field range when the first objective and the second objective are used respectively are as below.

When the first objective is used: the total amount of light is 3.27 W and the maximum luminance is 154.5 mW/m²

When the second objective is used: total amount of light is 0.381 W and the maximum luminance is 1292 mW/m²

As explained in FIG. 13A through FIG. 13E and in the above result, the microscope illumination device according to the present example makes it possible to provide bright illumination while uniformly illuminating a wide illumination scope. Thus, both the illumination efficiency and the uniformity of illumination can be achieved at a high level by using a white LED light source.

The respective embodiments and examples described above are for providing specific examples so as to facilitate understanding of the invention, and the present invention is not limited to these embodiments or examples. The microscope illumination devices and the microscopes can receive various modifications and changes without departing from the spirit of the present invention, the spirit being defined by the claims.

What is claimed is:

1. A microscope illumination device comprising:
a white LED light source including a substrate, a plurality of LED chips, and a fluorescent substance layer provided to cover the plurality of LED chips, the plurality of LED chips being arrayed on the substrate and being configured to emit excitation light; and
an illumination optical system that (i) irradiates a subject with light from the white LED light source, (ii) includes a field stop and a light diffusion element, and (iii) is arranged to illuminate the subject by Kohler illumination, the light diffusion element being arranged between the white LED light source and the field stop and being configured to diffuse the light,
wherein the illumination optical system further includes:
a collector lens that is arranged between the white LED light source and the light diffusion element;
an aperture stop that is arranged in such a manner that the field stop is positioned between the light diffusion element and the aperture stop;
a relay lens that is arranged between the field stop and the aperture stop; and
a condenser lens that is arranged in such a manner that the aperture stop is positioned between the relay lens and the condenser lens, and
wherein conditional expressions of:

$$0.2 < d/p < 1 \quad (1)$$

$$(p-d)/(2 \times F_{co}) \leq NA1 \times F_{cd}/F_{r1} \quad (2)$$

and $$NA1/NA < 1/3 \quad (3)$$

are satisfied, where p is a minimum interval between centers of the plurality of LED chips, d is a size of each of the plurality of LED chips, $F_{co}$ is a focal length of the collector lens, $F_{r1}$ is a focal length of the relay lens, $F_{cd}$ is a focal length of the condenser lens, NA is a numerical aperture of the condenser lens, and NA1 is a numerical aperture of an objective with a magnification corresponding to a maximum illumination scope of the condenser lens.

2. The microscope illumination device according to claim 1, further satisfying a conditional expression of:

$$1/2 \times \tan^{-1}((p-d)/F_{co}) \leq \theta \leq 6 \times \tan^{-1}((p-d)/F_{co}) \quad (4)$$

where θ is a scattering angle of diffused light emitted from the light diffusion element, the scattering angle being an angle at which the diffused light is emitted from the light diffusion element with an intensity that is ½ of that of diffused light emitted in a traveling direction of entering light.

3. The microscope illumination device according to claim 2, further satisfying a conditional expression of:

$$NA \times F_{cd}/F_{r1} < R/(2 \times F_{co}) + \sin \theta \quad (5)$$

where R is a diameter of a minimum circle that includes the plurality of LED chips.

4. The microscope illumination device according to claim 3, further satisfying a conditional expression of:

$$0.5 \leq R/\varphi_{LED} \quad (6)$$

where $\varphi_{LED}$ is a diameter of a circle that is inscribed in the fluorescent substance layer.

5. The microscope illumination device according to claim 1, further satisfying a conditional expression of:

$$0.5 \leq R/\varphi_{LED} \quad (6)$$

where $\varphi_{LED}$ is a diameter of a circle that is inscribed in the fluorescent substance layer, and R is a diameter of a minimum circle that includes the plurality of LED chips.

6. The microscope illumination device according to claim 2, further satisfying a conditional expression of:

$$0.5 \leq R/\varphi_{LED} \quad (6)$$

where $\varphi_{LED}$ is a diameter of a circle that is inscribed in the fluorescent substance layer and R is a diameter of a minimum circle that includes the plurality of LED chips.

7. The microscope illumination device according to claim 1, further satisfying a conditional expression of:

$$NA \times F_{cd}/F_{r1} < R/(2 \times F_{co}) + \sin \theta \quad (5)$$

where θ is a scattering angle of diffused light emitted from the light diffusion element, the scattering angle being an angle at which the diffused light is emitted from the light diffusion element with an intensity that is ½ of that of diffused light emitted in a traveling direction of entering light and R is a diameter of a minimum circle that includes the plurality of LED chips.

8. The microscope illumination device according to claim 7, further satisfying a conditional expression of:

$$0.5 \leq R/\varphi_{LED} \quad (6)$$

where $\varphi_{LED}$ is a diameter of a circle that is inscribed in the fluorescent substance layer.

9. A microscope illumination device comprising:
a white LED light source including a substrate, a plurality of LED chips, and a fluorescent substance layer provided to cover the plurality of LED chips, the plurality of LED chips being arrayed on the substrate and being configured to emit excitation light; and
an illumination optical system that (i) irradiates a subject with light from the white LED light source, (ii) includes a field stop and a light diffusion element, and (iii) is arranged to illuminate the subject by Kohler illumination, the light diffusion element being arranged between the white LED light source and the field stop and being configured to diffuse the light,
wherein the illumination optical system further includes a collector lens that is arranged between the white LED light source and the light diffusion element, and
wherein conditional expressions of:

$$0.2 < d/p < 1 \quad (1) \text{ and}$$

$$1/2 \times \tan^{-1}((p-d)/F_{co}) \leq \theta \leq 6 \times \tan^{-1}((p-d)/F_{co}) \quad (4)$$

are satisfied, where p is a minimum interval between centers of the plurality of LED chips, d is a size of each of the plurality of LED chips, $F_{co}$ is a focal length of the collector lens, and θ is a scattering angle of diffused light emitted from the light diffusion element, the scattering angle being an angle at which the diffused light is emitted from the diffusion element with an intensity that is ½ of that of diffused light emitted in a traveling direction of entering light.

10. The microscope illumination device according to claim 9,
wherein the illumination optical system further includes:
an aperture stop that is arranged in such a manner that the field stop is positioned between the light diffusion element and the aperture stop;
a relay lens that is arranged between the field stop and the aperture stop; and
a condenser lens that is arranged in such a manner that the aperture stop is positioned between the relay lens and the condenser lens, and
wherein a conditional expression of:

$$NA \times F_{cd}/F_{rl} < R/(2 \times F_{co}) + \sin\theta \quad (5)$$

is satisfied, where $F_{rl}$ is a focal length of the relay lens, $F_{cd}$ is a focal length of the condenser lens, NA is a numerical aperture of the condenser lens, and R is a diameter of a minimum circle that includes the plurality of LED chips.

11. The microscope illumination device according to claim 10, further satisfying a conditional expression of:

$$0.5 \leq R/\varphi_{LED} \quad (6)$$

where $\varphi_{LED}$ is a diameter of a circle that is inscribed in the fluorescent substance layer.

12. The microscope illumination device according to claim 9, further satisfying a conditional expression of:

$$0.5 \leq R/\varphi_{LED} \quad (6)$$

where $\varphi_{LED}$ is a diameter of a circle that is inscribed in the fluorescent substance layer, and R is a diameter of a minimum circle that includes the plurality of LED chips.

13. A microscope illumination device comprising:
a white LED light source including a substrate, a plurality of LED chips, and a fluorescent substance layer provided to cover the plurality of LED chips, the plurality of LED chips being arrayed on the substrate and being configured to emit excitation light; and
an illumination optical system that (i) irradiates a subject with light from the white LED light source, (ii) includes a field stop and a light diffusion element, and (iii) is arranged to illuminate the subject by Kohler illumination, the light diffusion element being arranged between the white LED light source and the field stop and being configured to diffuse the light,
wherein the illumination optical system further comprises:
a collector lens that is arranged between the white LED light source and the light diffusion element;
an aperture stop that is arranged in such a manner that the field stop is positioned between the light diffusion element and the aperture stop;
a relay lens that is arranged between the field stop and the aperture stop; and
a condenser lens that is arranged in such a manner that the aperture stop is positioned between the relay lens and the condenser lens, and
wherein conditional expressions of:

$$0.2 < d/p < 1 \quad (1) \text{ and}$$

$$NA \times F_{cd}/F_{rl} < R/(2 \times F_{co}) + \sin\theta \quad (5)$$

are satisfied, where p is a minimum interval between centers of the plurality of LED chips, d is a size of each of the plurality of LED chips, $F_{co}$ is a focal length of the collector lens, $F_{rl}$ is a focal length of the relay lens, $F_{cd}$ is a focal length of the condenser lens, NA is a numerical aperture of the condenser lens, and $\theta$ is a scattering angle of diffused light emitted from the light diffusion element, the scattering angle being an angle at which the diffused light is emitted from the diffusion element with an intensity that is ½ of that of diffused light emitted in a traveling direction of entering light, and R is a diameter of a minimum circle that includes the plurality of LED chips.

14. The microscope illumination device according to claim 13, further satisfying a conditional expression of:

$$0.5 \leq R/\varphi_{LED} \quad (6)$$

where $\varphi_{LED}$ is a diameter of a circle that is inscribed in the fluorescent substance layer.

* * * * *